(12) United States Patent
Ji et al.

(10) Patent No.: US 12,449,155 B2
(45) Date of Patent: Oct. 21, 2025

(54) AIR CONDITIONER, CONTROL METHOD FOR AIR CONDITIONER, AND COMPUTER-READABLE STORAGE MEDIUM

(71) Applicant: GD MIDEA AIR-CONDITIONING EQUIPMENT CO., LTD., Guangdong (CN)

(72) Inventors: Ansheng Ji, Guangdong (CN); Guojian Cai, Guangdong (CN); Shunkai Du, Guangdong (CN); Fuxing Zhai, Guangdong (CN); Jian He, Guangdong (CN); Qiwei Liu, Guangdong (CN)

(73) Assignee: GD MIDEA AIR-CONDITIONING EQUIPMENT CO., LTD., Guangdong (CN)

( * ) Notice: Subject to any disclaimer, the term of this patent is extended or adjusted under 35 U.S.C. 154(b) by 496 days.

(21) Appl. No.: 17/877,097

(22) Filed: Jul. 29, 2022

(65) Prior Publication Data

US 2022/0373213 A1 Nov. 24, 2022

Related U.S. Application Data

(63) Continuation of application No. PCT/CN2020/082245, filed on Mar. 31, 2020.

(30) Foreign Application Priority Data

Feb. 26, 2020 (CN) .......................... 202010120382.7

(51) Int. Cl.
*F24F 11/79* (2018.01)
*F24F 13/08* (2006.01)
(Continued)

(52) U.S. Cl.
CPC ............. *F24F 11/79* (2018.01); *F24F 13/082* (2013.01); *F24F 13/1413* (2013.01); *F24F 2110/10* (2018.01); *F24F 2110/20* (2018.01)

(58) Field of Classification Search
CPC ...... F24F 11/79; F24F 13/082; F24F 13/1413; F24F 2110/10; F24F 2110/20
See application file for complete search history.

(56) References Cited

U.S. PATENT DOCUMENTS

| 6,916,240 B1 * | 7/2005 | Morton | ................. F24F 13/065 454/286 |
| 2005/0173547 A1 * | 8/2005 | George | ............... F24F 13/1413 236/49.3 |

(Continued)

FOREIGN PATENT DOCUMENTS

| CN | 105180267 A | 12/2015 |
| CN | 108397866 A | 8/2018 |

(Continued)

OTHER PUBLICATIONS

Supplementary European Search report dated Jun. 20, 2023 received in European Patent Application No. EP 20921969.0.

(Continued)

*Primary Examiner* — Mong-Shune Chung
(74) *Attorney, Agent, or Firm* — Scully, Scott, Murphy & Presser, P.C.

(57) ABSTRACT

An air conditioner, a control method for the air conditioner, and a computer-readable storage medium are provided. The air conditioner has a body, an air outlet provided on the body, and an air output structure for adjusting an air output angle of the air outlet. The air output structure has multiple operative configurations. The air conditioner also has a detection device for acquiring an ambient temperature and an ambient humidity, and a controller electrically connected to the air output structure and the detection device. The (Continued)

controller controls the air output structure to switch among the operative configurations according to the ambient temperature and the ambient humidity, and further adjusts the air output angle of the air outlet and causes the air output angle and the amount of air output to match with the current ambient temperature and the current ambient humidity.

17 Claims, 12 Drawing Sheets

(51) Int. Cl.
*F24F 13/14* (2006.01)
*F24F 110/10* (2018.01)
*F24F 110/20* (2018.01)

(56) References Cited

U.S. PATENT DOCUMENTS

| | | | | |
|---|---|---|---|---|
| 2017/0234572 | A1* | 8/2017 | Harris | F24F 13/14 454/248 |
| 2018/0023840 | A1* | 1/2018 | Yamaji | F24F 11/89 62/126 |
| 2018/0172305 | A1 | 6/2018 | Son et al. | |
| 2018/0271299 | A1* | 9/2018 | Harada | A47C 21/048 |
| 2020/0049358 | A1* | 2/2020 | Suciu | F24F 11/79 |
| 2022/0221182 | A1* | 7/2022 | Wei | F24F 11/64 |

FOREIGN PATENT DOCUMENTS

| | | | | |
|---|---|---|---|---|
| CN | 110319562 A | | 10/2019 | |
| CN | 110319563 A | | 10/2019 | |
| CN | 110319565 A | | 10/2019 | |
| CN | 110319566 A | | 10/2019 | |
| CN | 110579009 A | * | 12/2019 | F24F 11/61 |
| CN | 110701772 A | | 1/2020 | |
| CN | 111043666 B | * | 2/2025 | F24F 1/0014 |
| JP | 2014-199177 A | | 10/2014 | |
| WO | WO-2019078067 A1 | * | 4/2019 | F24F 11/65 |

OTHER PUBLICATIONS

International Search Report dated Dec. 1, 2020 received in International Application No. PCT/CN2020/082245.

* cited by examiner

AIR CONDITIONER, CONTROL METHOD FOR AIR CONDITIONER, AND COMPUTER-READABLE STORAGE MEDIUM

CROSS-REFERENCE TO RELATED APPLICATIONS

This application is a continuation application of PCT International Patent Application No. PCT/CN2020/082245, filed on Mar. 31, 2020, which claims priority to and benefits of Chinese Patent Application No. 202010120382.7 filed with China National Intellectual Property Administration on Feb. 26, 2020 and entitled "Air Conditioner, Control Method for Air Conditioner, and Computer-Readable Storage Medium", the entire contents of which are herein incorporated by reference for all purposes. No new matter has been introduced.

FIELD

The present disclosure relates to the technical field of air conditioners, and in particular to an air conditioner, a control method for the air conditioner, and a computer-readable storage medium.

BACKGROUND

At present, an air supply mode of an air conditioner in the related art is generally relevant to a working mode of the air conditioner, there is a single air supply mode in the same working mode, and thus, after the air conditioner switches to a different working mode, it takes a long time to reach a point that is comfortable for a user, which may not satisfy the user experience.

SUMMARY

The present disclosure is directed to solve at least one of technical problems existing in the prior art or related art.

To this end, it is an object of a first aspect of the present disclosure to provide an air conditioner.

It is an object of a second aspect of the present disclosure to provide a control method for an air conditioner.

It is an object of a third aspect of the present disclosure to provide a computer-readable storage medium.

In view of this, according to a first aspect of the present disclosure, the present disclosure provides an air conditioner including an air conditioner body, an air outlet being provided on the air conditioner body; an air output structure configured to adjust an air output angle of the air outlet, the air output structure being provided with a plurality of operative configurations; a detection device configured to be suitable for acquiring an ambient temperature and an ambient humidity; and a controller, the controller being electrically connected to the air output structure and the detection device and switching the operative configurations of the air output structure according to the ambient temperature and the ambient humidity.

The present disclosure provides the air conditioner including the air conditioner body, the air output structure, the detection device, and the controller, wherein the air outlet is provided on the air conditioner body, and the air output structure is configured to adjust the air output state of the air outlet. The air output structure is provided with the plurality of operative configurations, and the controller adjusts the air output angle of the air outlet by switching the air output structure to work in different operative configurations, thereby adjusting the amount of air output. An ambient temperature and an ambient humidity of an environment where the air conditioner is located are acquired by the detection device, and the controller switches the operative configurations of the air output structure according to the ambient temperature and the ambient humidity acquired by the detection device and then adjust the air output angle of the air outlet and cause the air output angle and the amount of air output to be matched with the current ambient temperature and the current ambient humidity, thereby being able to cause, after the air conditioner has switched to a different working mode, the ambient temperature and the ambient humidity to rapidly reach a point that is comfortable for the human body, and then, improving the use experience for the air conditioner.

In addition, the air conditioner provided in the above-mentioned embodiment of the present disclosure may further have the following additional technical features.

In the above-mentioned embodiment, the plurality of operative configurations include a first operative configuration. The air conditioner further includes a communication interface connected to the controller and configured to receive a control instruction; and the controller controls the air output structure to work in the first operative configuration according to the control instruction.

In this embodiment, the plurality of operative configurations of the air output structure include the first operative configuration. By disposing the communication interface in the air conditioner and connecting the communication interface to the controller, the communication interface receives the control instruction sent by a user, the controller controls the air output structure to work in the first operative configuration according to the control instruction, and then, the air output angle and the amount of air output achieved under the condition that the air output structure works in the first operative configuration may meet demands of the corresponding control instruction on the heat exchange capability and the amount of air output of the air conditioner, and then the ambient temperature and the ambient humidity rapidly reach a point that is comfortable for the user, and the use experience of the user is improved.

The control instruction is a windless feeling instruction. The first operative configuration in the plurality of operative configurations is a windless feeling default form, and the controller controls the air output structure to work in the first operative configuration according to the windless feeling instruction, and then the air output angle and the amount of air output achieved when the air output structure works in the first operative configuration may meet the demand of a user on windless feeling air output, that is, the air output by the air conditioner is closer to natural wind, the uniformity of the temperature in a room is improved while the amount of air output and the cooling capacity are guaranteed, and the use experience for the air conditioner is improved. Meanwhile, the controller controls the air output structure to be immediately switched to work in the first operative configuration according to the windless feeling instruction, which is beneficial to the assurance that the ambient temperature and the ambient humidity rapidly reach a point that is comfortable for the user.

In any one of the above-mentioned embodiments, the plurality of operative configurations further include a second operative configuration and a third operative configuration. The step of the controller switches the operative configurations of the air output structure according to the ambient temperature and the ambient humidity can include: acquiring a temperature threshold, and calculating a temperature difference of the ambient temperature and the temperature threshold; and acquiring a humidity threshold, and calculating a humidity difference of the ambient humidity and the humidity threshold; determining that the temperature difference is within a first preset temperature range, or the humidity difference is within a first preset humidity range, and switching the air output structure to work in the third operative configuration; determining that the temperature difference is within a second preset temperature range, and the humidity difference is within a second preset humidity range or a third preset humidity range, and switching the air output structure to work in the second operative configuration; determining that the temperature difference is within the second preset temperature range or a third preset temperature range, and the humidity difference is within the second preset humidity range, and switching the air output structure to work in the second operative configuration; and determining that the temperature difference is within the third preset temperature range, and the humidity difference is within the third preset humidity range, and switching the air output structure to work in the first operative configuration.

In this embodiment, a specific manner that the controller switches the operative configurations of the air output structure according to the ambient temperature and the ambient humidity is limited. The plurality of operative configurations of the air output structure further include the second operative configuration and the third operative configuration. The first operative configuration shows a windless feeling default angle, the second operative configuration shows a second windless feeling angle, and the third operative configuration shows a third windless feeling angle.

The temperature threshold and the humidity threshold are acquired, the difference of the ambient temperature and the temperature threshold is calculated to obtain the temperature difference, and the difference of the ambient humidity and the humidity threshold is calculated to obtain the humidity difference; the temperature difference is compared with the preset temperature ranges, and the humidity difference is compared with the preset humidity ranges, wherein the preset temperature ranges at least include the first preset temperature range, the second preset temperature range, and the third preset temperature range, and the preset humidity ranges at least include the first preset humidity range, the second preset humidity range, and the third preset humidity range; and the operative configurations of the air output structure are switched according to a result achieved by comparing the temperature difference with the first preset temperature range, the second preset temperature range, and the third preset temperature range, and a result achieved by comparing the humidity difference with the first preset humidity range, the second preset humidity range, and the third preset humidity range, and then the plurality of operative configurations of the air output structure may adapt to the change of a different ambient temperature and a different ambient humidity to ensure that the air conditioner rapidly and effectively adjusts the ambient temperature and the ambient humidity to a point that is comfortable for a user, the time for reaching the point that is comfortable in a room is shortened, and the user experience for the comfort level is improved.

In any one of the above-mentioned technical, the air output structure includes a first air deflector rotatably connected to the air conditioner body and configured to open or close the air outlet, the first air deflector being provided with a through hole suitable for allowing an air flow to pass through; and an air diffusing structure connected to the air conditioner body and suitable for moving relative to the air conditioner body to shield or open the air outlet, the air diffusing structure being formed with an air diffusing structure, and the air diffusing structure being suitable for allowing an air flow to pass through and being further suitable for enabling the passed air flow to dissipate and flow.

In this embodiment, the air output structure includes the first air deflector and the air diffusing structure. By disposing the first air deflector, the air outlet of the air conditioner may be opened or closed. Moreover, the first air deflector is provided with the through hole suitable for allowing the air flow to pass through, and then the buffering effect of the first air deflector on guiding the air flow is further improved, and the air flow is enabled to more steady and smoother. The air diffusing structure is connected to the air conditioner body and is suitable for rotating relative to the air conditioner body to shield or open the air outlet opened by the first air deflector. When the air outlet is shielded by the air diffusing structure, the air flow may pass by the air diffusing structure disposed on the air conditioner body, and the air flow passing through the air diffusing structure may be dissipated by the air diffusing structure to form "disordered" air output in a "random wind direction", and then the air flow is prevented from being directly blown to a human body, direct blowing is relieved, and the windless feeling demand of a user on the air conditioner is met.

In any one of the above-mentioned embodiments, the air output structure further includes a second air deflector disposed in the air outlet, and the second air deflector is suitable for rotating relative to a direction of the air outlet and then change an air supply direction of the air outlet.

In this embodiment, the second air deflector is disposed in the air outlet and may rotate along an axis parallel to the air outlet, thereby changing the air supply direction of the air outlet, and achieving air supply in different directions such as "far" air supply or "near" air supply.

In any one of the above-mentioned embodiments, the air conditioner body includes a housing, the housing is provided with a front side wall and a lower side wall, and the air outlet is formed on a transition position of the front side wall of the housing and the lower side wall of the housing.

In this embodiment, the air outlet faces the "lower front" side of the air conditioner. That is, for a wall-mounted air conditioner installed to according to a standard, the air outlet includes a first-direction air outlet approximately in a horizontal direction and a second-direction air outlet approximately in a vertical direction, wherein the first-direction air outlet faces a direction corresponding to the front side wall, namely the front of the air conditioner, and the second-direction air outlet faces a direction corresponding to the lower side wall, namely the downside of the air conditioner. By adjusting the components of the amount of air output of the air outlet in the first direction and the second direction, it may be ensured that the output air may not be directly blown to the human body, the overall amount of air output of the air conditioner may be increased on the premise that it is windless feeling, and the cooling or heating efficiency of the air conditioner may be increased.

Further, the housing further includes a left end cover and a right end cover, and side air outlets are respectively provided in the left end cover and the right end cover and then achieve lateral air output.

In any one of the above-mentioned embodiments, the air diffusing structure includes a plurality of wind wheels. The plurality of wind wheels are engaged and driven by a gear structure, each wind wheel includes an inner rib and an outer ring rib, a first blade group and a second blade group are disposed between the inner rib and the outer ring rib, blades in the first blade group are fixedly connected to the inner rib and the outer ring rib, the second blade group is rotatably connected to the inner rib, and the second blade group is provided with a first position and a second position; wherein when the second blade group is located on the first position, a plurality of blades in the second blade group and the plurality of blades in the first blade group are arranged at intervals; and when the second blade group is located on the second position, the blades in the second blade group and the blades in the first blade group at least partially overlap in the axial directions of the wind wheels.

In this embodiment, the air diffusing structure includes the plurality of wind wheels. The plurality of wind wheels are engaged and driven by the gear structure to achieve the linkage of the plurality of wind wheels. By disposing the first blade group and the second blade group, the air flow passing by the air diffusing structure is dissipated, and thus, a windless feeling effect is achieved. Each of the first blade group and the second blade group includes a plurality of blades, and when an air flow flows through the first blade group and the second blade group, the air flow is dissipated due to the obstruction of the plurality of blades to form the "disordered" air output in the "random wind direction", and then the windless feeling effect is achieved.

Further, the blades in the first blade group are fixedly connected to the inner rib and the outer ring rib, the second blade group is rotatably connected to the inner rib, that is, the second blade group may rotate relative to the first blade group. Meanwhile, the second blade group is provided with the first position and the second position. When the second blade group is located on the first position, the plurality of blades in the second blade group and the plurality of blades in the first blade group are arranged at intervals, and the blades which are disposed at intervals may increase the coverage area of the blades of the blade groups, thereby reducing the circulation area of the air flow and achieving weaker air delivery. When the second blade group is located on the second position, the blades in the second blade group and the blades in the first blade group at least partially overlap in the axial directions of the wind wheels; and when the two groups of blades partially overlap, the coverage area of the blades is reduced, and then the circulation area of the air flow is increased, and then, stronger air delivery is achieved.

In any one of the above-mentioned embodiments, when the first operative configuration of the air output structure is formed, the air outlet is opened by the first air deflector, the air diffusing structure is abutted against the first air deflector and shields the air outlet, and the second blade group moves to the first position.

In this embodiment, when the first operative configuration of the air output structure is formed, that is, the first air deflector and the air diffusing structure of the air output structure are located at the windless feeling default angle, the first air deflector rotates and opens the air outlet, the air diffusing structure rotates to be abutted against the first air deflector and shields the air outlet, and the second blade group moves to the first position. At the moment, the blades in the first blade group and the second blade group are arranged at intervals, and the circulation area of the air flow is small, and then a working form in which the cooling capacity is lower is achieved, and the demand on the cooling capacity when the difference of an indoor ambient temperature and a comfortable temperature value is smaller and the difference of the ambient humidity and a comfortable humidity value is smaller may be met.

In any one of the above-mentioned embodiments, when the second operative configuration of the air output structure is formed, the air outlet is opened by the first air deflector, the air diffusing structure is abutted against the first air deflector and shields the air outlet, and the second blade group moves to the second position.

In this embodiment, when the second operative configuration of the air output structure is formed, the first air deflector and the air diffusing structure of the air output structure are located at the second windless feeling angle, at the moment, the air outlet is opened by the first air deflector, the air diffusing structure is abutted against the first air deflector and shields the air outlet, and the second blade group moves to the second position. At the moment, the blades in the first blade group and the second blade group at least partially overlap, and the circulation area of the air flow is increased, and then a working form in which the cooling capacity is moderate is achieved, and the demand on the cooling capacity when the difference of an indoor ambient temperature and a comfortable temperature value is moderate or smaller, and the difference of the ambient humidity and a comfortable humidity value is moderate, or the demand on the cooling capacity when the difference of the indoor ambient temperature and the comfortable temperature value is moderate, and the difference of the ambient humidity and a comfortable humidity value is moderate or smaller may be met.

In any one of the above-mentioned embodiments, when the third operative configuration of the air output structure is formed, the air outlet includes a first part of air outlet, a second part of air outlet, and a third part of air outlet, the first part of air outlet is closed by the first air deflector, the second part of air outlet is shielded by the air diffusing structure, the third part of air outlet is formed between the first air deflector and the air diffusing structure, and the second blade group moves to the second position.

In this embodiment, when the third operative configuration of the air output structure is formed, it is proven that the air conditioner needs to work under higher cooling capacity and greater circulation of the air flow, at the moment, the air outlet includes the first part of air outlet, the second part of air outlet, and the third part of air outlet, the first part of air outlet is closed by the first air deflector, the second part of air outlet is shielded by the air diffusing structure, and the third part of air outlet is formed between the first air deflector and the air diffusing structure. At the moment, a part of the air flow blown from the air outlet flows through the air diffusing structure to achieve windless feeling air output, another part of the air flow directly flows through the third part of air outlet to achieve rapid cooling, and further part of the air flow flows through the through hole of the first air deflector. By such an arrangement, it is ensured that a sufficient air flow flows out to achieve rapid cooling and rapid temperature and humidity reduction, meanwhile, the phenomenon that user experience is affected by direct blowing of the air flow due to over high air flow may be avoided, and windless feeling air output is achieved; and the demand on the cooling capacity when the difference of an indoor ambient temperature and a comfortable temperature value is greater, or the difference of the ambient humidity and a comfortable humidity value is greater may be met, and meanwhile, windless feeling air output is achieved.

Further, circulation is formed by a positive pressure at the air outlet and a negative pressure at a return air inlet in the windless feeling mode of the air conditioner, and due to smaller air volume, a room is poor in spatial circulation and is easily stuffy. Therefore, when the air output structure works in the third operative configuration, a part of the air flow blown from the air outlet flows through the air diffusing structure to achieve windless feeling air output, namely air output with a small air volume, another part of the air flow directly flows through the third part of air outlet to achieve air output with a great air volume, and further part of the air flow flows through the through hole of the first air deflector to achieve air output with a small air volume. Air flow exchange on far and near positions in the room may be promoted, then, the circulation efficiency of the air flow is increased, and the comfort level in the room is increased.

In any one of the above-mentioned embodiments, the first air deflector and the air diffusing structure are spliced to define an included-angle-shaped cavity located on the outer side of the air outlet of the air conditioner and communicating with the air outlet of the air conditioner, the cavity is formed with side openings respectively along two ends of a length direction of a splicing line of the first air deflector and the air diffusing structure, and the side openings communicate with the cavity.

In this embodiment, the first air deflector and the air diffusing structure are spliced to define the included-angle-shaped cavity which is located on the outer side of the air outlet and communicates with the air outlet. The cavity is formed with the side openings respectively along two ends (namely the left and right sides of the air conditioner) of the length direction of the splicing line of the first air deflector and the air diffusing structure, and the side openings communicate with the cavity and are used for achieving "lateral" air output. When the air conditioner is installed, the "front side" of the air conditioner often faces an activity area of indoor personnel, and therefore, the "lateral" air output may effectively avoid direct blowing of the air blown from the air conditioner to the human body and improve the user experience of the air conditioner.

A second aspect of the present disclosure provides a control method for an air conditioner, which is used for controlling the air conditioner according to any one of the above-mentioned embodiments. The control method includes: acquiring an ambient temperature and an ambient humidity; and switching the operative configurations of the air output structure of the air conditioner according to the ambient temperature and the ambient humidity.

According to the control method for the air conditioner provided by the present disclosure, an ambient temperature and an ambient humidity of an environment where the air conditioner is located are acquired by the detection device, and the controller switches the operative configurations of the air output structure according to the ambient temperature and the ambient humidity acquired by the detection device and then adjust the air output angle of the air outlet and cause the air output angle and the amount of air output to be matched with the current ambient temperature and the current ambient humidity, thereby being able to cause, after the air conditioner has switched to a different working mode, the ambient temperature and the ambient humidity to rapidly reach a point that is comfortable for the human body, and then, improving the use experience for the air conditioner.

Further, the plurality of operative configurations of the air output structure may adapt to the change of a different ambient temperature and a different ambient humidity. By switching the operative configurations of the air output structure according to the ambient temperature and the ambient humidity, and then, adjusting the air output direction and the cooling capacity, it may be ensured that the air conditioner rapidly and effectively adjusts the ambient temperature and the ambient humidity to a point that is comfortable for a user, and the comfort level of the air conditioner is further improved. The plurality of operative configurations of the air output structure may meet the demands on normal air output and windless feeling air output of the air conditioner, and then the operative configurations of the air output structure are switched according to the demands on the normal air output and the windless feeling air output, by which the air conditioner may achieve the normal air output and the windless feeling air output, then, rapid cooling is achieved under the condition of the normal air output, the comfort level is improved under the condition of the windless feeling air output, and then, the function of the product is expanded. Further, the plurality of operative configurations of the air output structure may further meet the demands on the different ambient temperature and the different ambient humidity when the air conditioner is in the state of windless feeling air output, and then the operative configurations of the air output structure are switched according to the demands on the ambient temperature and the ambient humidity to achieve rapid cooling in a room and windless feeling experience, meanwhile, the ambient temperature and the ambient humidity rapidly reach a point that is comfortable for a user, and then, the use experience for a higher comfort level is achieved. By setting the plurality of operative configurations of the air output structure, the demands on different environments and different air output energy are met, and the use range of the product is widened.

In the above-mentioned embodiment, further, the control method further includes: receiving a control instruction, and controlling the air output structure to work in the first operative configuration according to the control instruction.

In this embodiment, the plurality of operative configurations of the air output structure include the first operative configuration. By disposing the communication interface in the air conditioner and connecting the communication interface to the controller, the communication interface receives the control instruction sent by a user, the controller controls the air output structure to work in the first operative configuration according to the control instruction, and then, the air output angle and the amount of air output achieved under the condition that the air output structure works in the first operative configuration may meet demands of the corresponding control instruction on the heat exchange capability and the amount of air output of the air conditioner, and then the ambient temperature and the ambient humidity rapidly reach a point that is comfortable for a user, and the use experience of the user is improved.

In the above-mentioned embodiment, further, the step of switching the operative configurations of the air output structure of the air conditioner according to the ambient temperature and the ambient humidity can include: acquiring a temperature threshold and a humidity threshold, and calculating a temperature difference of the ambient temperature and the temperature threshold and a humidity difference of the ambient humidity and the humidity threshold; determining that the temperature difference is within a first preset temperature range, or the humidity difference is within a first preset humidity range, and switching the air output structure to work in the third operative configuration; determining that the temperature difference is within a second preset temperature range, and the humidity difference is within a second preset humidity range or a third preset humidity range, and switching the air output structure to work in the second operative configuration; determining that the temperature difference is within the second preset temperature range or a third preset temperature range, and the humidity difference is within the second preset humidity range, and switching the air output structure to work in the second operative configuration; and determining that the temperature difference is within the third preset temperature range, and the humidity difference is within the third preset humidity range, and switching the air output structure to work in the first operative configuration.

In this embodiment, a specific manner that the controller switches the operative configurations of the air output structure according to the ambient temperature and the ambient humidity is limited. The plurality of operative configurations of the air output structure further include the second operative configuration and the third operative configuration. The first operative configuration shows a windless feeling default angle, the second operative configuration shows a second windless feeling angle, and the third operative configuration shows a third windless feeling angle.

The temperature threshold and the humidity threshold are acquired, the difference of the ambient temperature and the temperature threshold is calculated to obtain the temperature difference, and the difference of the ambient humidity and the humidity threshold is calculated to obtain the humidity difference; the temperature difference is compared with the preset temperature ranges, and the humidity difference is compared with the preset humidity ranges, wherein the preset temperature ranges at least include the first preset temperature range, the second preset temperature range, and the third preset temperature range, and the preset humidity ranges at least include the first preset humidity range, the second preset humidity range, and the third preset humidity range; and the operative configurations of the air output structure are switched according to a result achieved by comparing the temperature difference with the first preset temperature range, the second preset temperature range, and the third preset temperature range, and a result achieved by comparing the humidity difference with the first preset humidity range, the second preset humidity range, and the third preset humidity range, and then the plurality of operative configurations of the air output structure may adapt to the change of a different ambient temperature and a different ambient humidity to ensure that the air conditioner rapidly and effectively adjusts the ambient temperature and the ambient humidity to a point that is comfortable for a user, the time for reaching the point that is comfortable in a room is shortened, and the user experience for the comfort level is improved.

In any one of the above-mentioned embodiments, the first preset temperature range is greater than a first temperature difference; the second preset temperature range is greater than a second temperature difference and is smaller than or equal to the first temperature difference; the third preset temperature range is smaller than or equal to the second temperature difference; the first preset humidity range is greater than a first humidity difference; the second preset humidity range is greater than a second humidity difference and is smaller than or equal to the first humidity difference; the third preset humidity range is smaller than or equal to the second humidity difference; wherein the first temperature difference ranges from 2° C. to 3.5° C.; the second temperature difference ranges from 0° C. to 2.5° C.; the first humidity difference ranges from 10% to 30%; the second humidity difference ranges from 0% to 10%; the temperature threshold ranges from 25° C. to 27° C.; and the humidity threshold ranges from 40% to 60%.

In this embodiment, the first temperature difference ranges from 2° C. to 3.5° C., and the second temperature difference ranges from 0° C. to 2.5° C., wherein the first preset temperature range is greater than the first temperature difference, the second preset temperature range is greater than the second temperature difference and is smaller than or equal to the first temperature difference, and the third preset temperature range is smaller than or equal to the second temperature difference. The first temperature difference and the second temperature difference may meet other required temperature values, and the first preset temperature range, the second preset temperature range and the third preset temperature range change with the first temperature difference and the second temperature difference.

The first humidity difference ranges from 10% to 30%, and the second humidity difference ranges from 0% to 10%, wherein the first preset humidity range is greater than the first humidity difference, the second preset humidity range is greater than the second humidity difference and is smaller than or equal to the first humidity difference, and the third preset humidity range is smaller than or equal to the second humidity difference. The first humidity difference and the second humidity difference may meet other required humidity values, and the first preset humidity range, the second preset humidity range and the third preset humidity range change with the first humidity difference and the second humidity difference.

The temperature threshold ranges from 25° C. to 27° C., and the humidity threshold ranges from 40% to 60%. When the indoor ambient temperature reaches 25° C. to 27° C., and the ambient humidity reaches 40% to 60%, a user feels more comfortable. The temperature threshold is a temperature which is comfortable for the human body, and the humidity threshold is a humidity which is comfortable for the human body. It may be understood that the temperature threshold and the humidity threshold may be correspondingly increased for people such as the old and children who are weaker. Therefore, the temperature threshold and the humidity threshold may be freely set according to actual demands of a user and are not limited to the above-mentioned range.

A third aspect of the present disclosure provides a computer-readable storage medium storing a computer program, wherein when the computer program is executed by a processor, the control method for the air conditioner according to any one of the above-mentioned embodiments is implemented.

The computer-readable storage medium provided by the present disclosure stores the computer program, wherein when the computer program is executed, the steps of the control method for the air conditioner according to any one of the above-mentioned embodiments is implemented. Therefore, all the beneficial technical effects of the control method for the air conditioner according to any one of the above-mentioned embodiments are achieved, the descriptions thereof are omitted herein.

Additional aspects and advantages of the present disclosure will be partially given in the following descriptions, will be apparent from the following descriptions, or may be learned by practice of the present disclosure.

BRIEF DESCRIPTION OF THE DRAWINGS

The foregoing and/or additional aspects and advantages of the present disclosure will be apparent from and elucidated in combination with the embodiments described hereinafter with reference to the accompanying drawings, in which.

Figure 1:
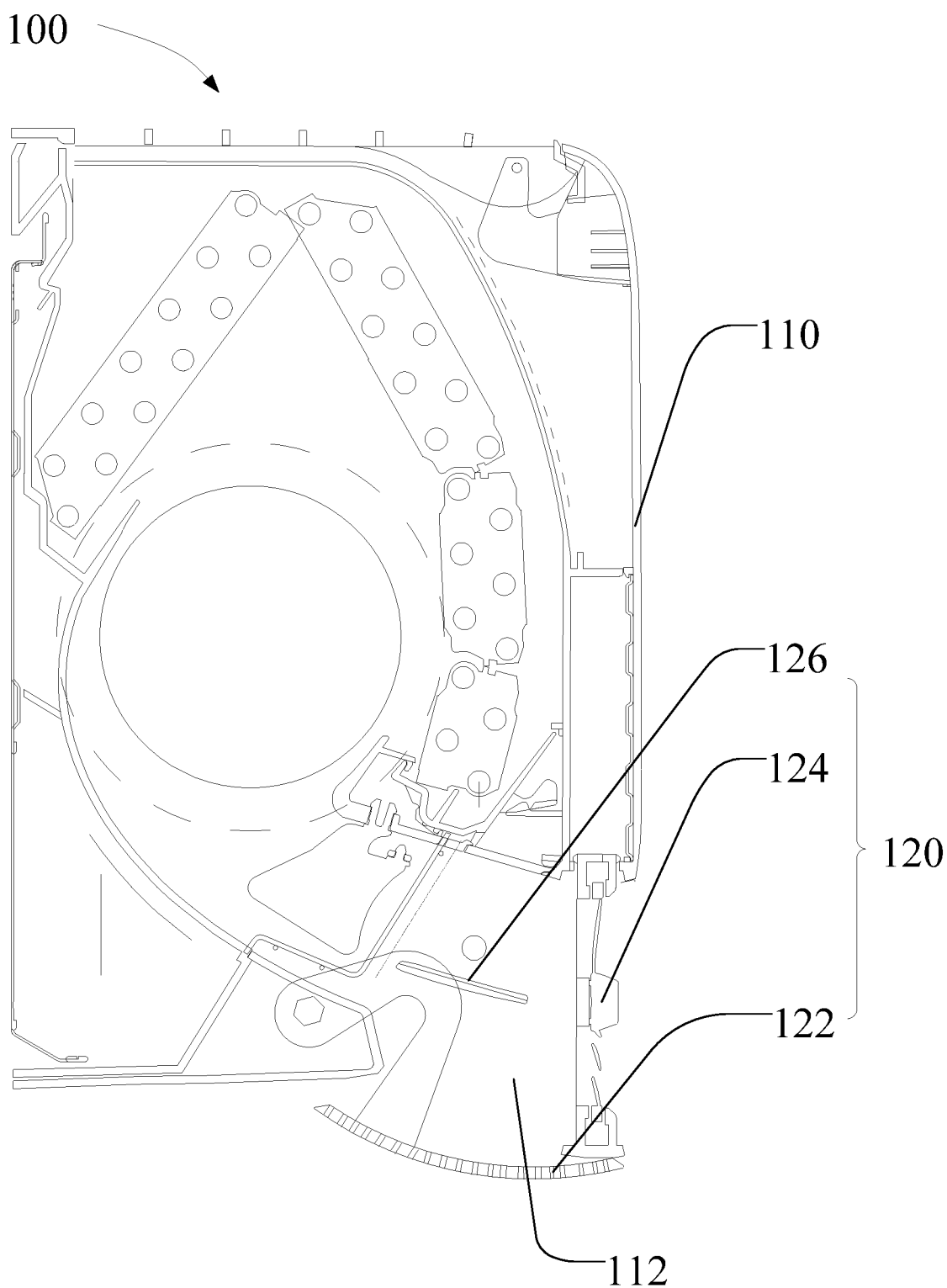
FIG. 1 is a schematic structural view of an air conditioner with an air output structure in a first operative configuration according to an embodiment of the present disclosure.

In the drawings, the correspondence between the reference numerals and the component names in FIGS. 1 to 12 is as follows:

100 air conditioner, 110 air conditioner body, 112 air outlet, 114 first part of air outlet, 116 second part of air outlet, 118 third part of air outlet, 120 air output structure, 122 first air deflector, 124 air diffusing structure, 126 second air deflector, 130 wind wheel, 132 inner rib, 134 outer ring rib, 136 first blade group, 138 second blade group, 400 detection device. 500 controller, and 600 communication interface.

DETAILED DESCRIPTION OF THE DISCLOSURE

In order to understand the above-mentioned objects, features and advantages of the present disclosure more clearly, the present disclosure will be described in further detail with reference to the accompanying drawings and detailed description. It should be noted that the embodiments and features in the embodiments of the present disclosure may be combined with one another without conflicts.

In the following description, numerous specific details are set forth in order to provide a thorough understanding of the present disclosure, but the present disclosure may be practiced otherwise than as described herein, and therefore, the protection scope of the present disclosure is not limited to the exemplary embodiments disclosed below.

An air conditioner 100, a control method for the air conditioner, and a computer-readable storage medium according to some embodiments of the present disclosure will now be described with reference to FIGS. 1 to 12.

As shown in FIGS. 1 to 8 and 12, according to a first aspect of the present disclosure, provided is an air conditioner 100 including an air conditioner body 110, an air outlet 112 being provided on the air conditioner body 110; an air output structure 120 configured to adjust an air output angle of the air outlet 112, and the air output structure 120 being provided with a plurality of operative configurations; a detection device 400 configured to be suitable for acquiring an ambient temperature and an ambient humidity; and a controller 500, the controller being electrically connected to the air output structure 120 and the detection device and switching the operative configurations of the air output structure 120 according to the ambient temperature and the ambient humidity.

The present disclosure provides the air conditioner 100 including the air conditioner body 110, the air output structure 120, the detection device, and the controller, wherein the air outlet 112 is provided on the air conditioner body 110, and the air output structure 120 is configured to adjust the air output state of the air outlet 112. The air output structure 120 is provided with the plurality of operative configurations, and the controller adjusts the air output angle of the air outlet 112 by switching the air output structure 120 to work in different operative configurations, thereby adjusting the amount of air output. An ambient temperature and an ambient humidity of an environment where the air conditioner 100 is located are acquired by the detection device, and the controller switches the operative configurations of the air output structure 120 according to the ambient temperature and the ambient humidity acquired by the detection device and then adjust the air output angle of the air outlet 112 and cause the air output angle and the amount of air output to be matched with the current ambient temperature and the current ambient humidity, thereby being able to cause, after the air conditioner has switched to a different working mode, the ambient temperature and the ambient humidity to rapidly reach a point that is comfortable for the human body, and then, improving the use experience for the air conditioner 100.

Further, the plurality of operative configurations of the air output structure 120 may adapt to the change of a different ambient temperature and a different ambient humidity. By switching the operative configurations of the air output structure 120 according to the ambient temperature and the ambient humidity, and then, adjusting the air output direction and the cooling capacity, it may be ensured that the air conditioner 100 rapidly and effectively adjusts the ambient temperature and the ambient humidity to a point that is comfortable for a user, and the comfort level of the air conditioner 100 is further improved.

The plurality of operative configurations of the air output structure 120 may meet the demands on normal air output and windless feeling air output of the air conditioner 100, and then the operative configurations of the air output structure 120 are switched according to the demands on the normal air output and the windless feeling air output, by which the air conditioner 100 may achieve the normal air output and the windless feeling air output, then, rapid cooling is achieved under the condition of the normal air output, the comfort level is improved under the condition of the windless feeling air output, and then, the function of the product is expanded. Further, the plurality of operative configurations of the air output structure 120 may further meet the demands on the different ambient temperature and the different ambient humidity when the air conditioner 100 is in the state of windless feeling air output, and then the operative configurations of the air output structure 120 are switched according to the demands on the ambient temperature and the ambient humidity to achieve rapid cooling in a room and windless feeling experience, meanwhile, the ambient temperature and the ambient humidity rapidly reach a point that is comfortable for a user, and then, the use experience for a higher comfort level is achieved. By setting the plurality of operative configurations of the air output structure 120, the demands on different environments and different air output energy are met, and the use range of the product is widened.

Wherein "windless feeling" is defined as follows: the average wind speed is lower than 0.1 m/s within a range 2.5 m to 3 m away from the air outlet of the air conditioner, or a DR (the output ratio of air) value ranges from 5 to 20 within a distance 2.5 m or below away from the air outlet of the air conditioner, at the moment, it is regarded as "windless feeling".

Figure 2:
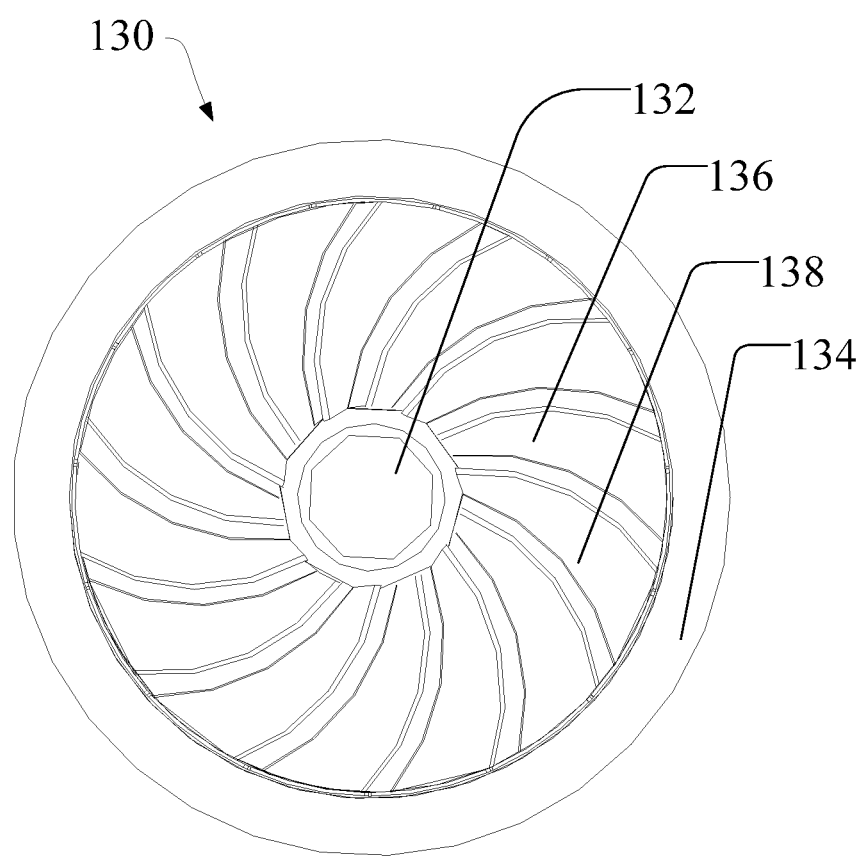
FIG. 2 is a schematic view showing a position of a wind wheel of the air conditioner shown in FIG. 1.
Figure 12:
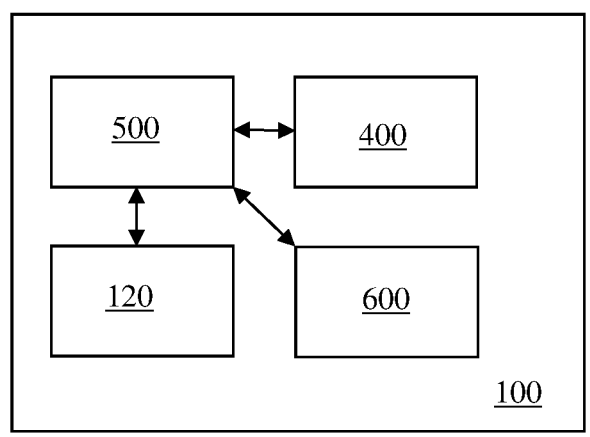
FIG. 12 is a schematic block diagram of the air conditioner.

As shown in FIGS. 1, 2 and 12, in an embodiment of the present disclosure, the plurality of operative configurations include a first operative configuration. The air conditioner 100 further includes a communication interface 600 connected to the controller and configured to receive a control instruction; and the controller controls the air output structure 120 to work in the first operative configuration according to the control instruction.

In this embodiment, as shown in FIGS. 1, 2 and 12, the plurality of operative configurations of the air output structure 120 includes the first operative configuration. The communication interface 600 is disposed in the air conditioner 100 and is connected to the controller 500, the communication interface receives the control instruction sent by a user, the controller controls the air output structure 120 to work in the first operative configuration according to the control instruction, and then, the air output angle and the amount of air output achieved under the condition that the air output structure 120 works in the first operative configuration may meet demands of the corresponding control instruction on the heat exchange capability and the amount of air output of the air conditioner 100, and then the ambient temperature and the ambient humidity rapidly reach a point that is comfortable for a user, and then, the use experience of the user is improved.

The control instruction is a windless feeling instruction. The first operative configuration in the plurality of operative configurations is a windless feeling default form, and the controller controls the air output structure 120 to work in the first operative configuration according to the windless feeling instruction, and then the air output angle and the amount of air output achieved when the air output structure 120 works in the first operative configuration may meet the demand of a user on windless feeling air output, that is, the air output by the air conditioner 100 is closer to natural wind, the uniformity of the temperature in a room is improved while the amount of air output and the cooling capacity are guaranteed, and the use experience for the air conditioner 100 is improved. Meanwhile, the controller controls the air output structure 120 to be immediately switched to work in the first operative configuration according to the windless feeling instruction, which is beneficial to the assurance that the ambient temperature and the ambient humidity rapidly reach a point that is comfortable for the user.

Further, as shown in FIGS. 3, 4, 5 and 6, the plurality of operative configurations further include a second operative configuration and a third operative configuration. The step of the controller switches the operative configurations of the air output structure 120 according to the ambient temperature and the ambient humidity can include: acquiring a temperature threshold, and calculating a temperature difference of the ambient temperature and the temperature threshold; and acquiring a humidity threshold, and calculating a humidity difference of the ambient humidity and the humidity threshold; determining that the temperature difference is within a first preset temperature range, or the humidity difference is within a first preset humidity range, and switching the air output structure 120 to work in the third operative configuration; determining that the temperature difference is within a second preset temperature range, and the humidity difference is within a second preset humidity range or a third preset humidity range, and switching the air output structure 120 to work in the second operative configuration; determining that the temperature difference is within the second preset temperature range or a third preset temperature range, and the humidity difference is within the second preset humidity range, and switching the air output structure 120 to work in the second operative configuration; and determining that the temperature difference is within the third preset temperature range, and the humidity difference is within the third preset humidity range, and switching the air output structure 120 to work in the first operative configuration.

The plurality of operative configurations of the air output structure 120 further include the second operative configuration and the third operative configuration. The first operative configuration shows a windless feeling default angle, the second operative configuration shows a second windless feeling angle, and the third operative configuration shows a third windless feeling angle. The temperature threshold and the humidity threshold are acquired, the difference of the ambient temperature and the temperature threshold is calculated to obtain the temperature difference, and the difference of the ambient humidity and the humidity threshold is calculated to obtain the humidity difference; the temperature difference is compared with the preset temperature ranges, and the humidity difference is compared with the preset humidity ranges, wherein the preset temperature ranges at least include the first preset temperature range, the second preset temperature range, and the third preset temperature range, and the preset humidity ranges at least include the first preset humidity range, the second preset humidity range, and the third preset humidity range; and the operative configurations of the air output structure 120 are switched according to a result achieved by comparing the temperature difference with the first preset temperature range, the second preset temperature range, and the third preset temperature range, and a result achieved by comparing the humidity difference with the first preset humidity range, the second preset humidity range, and the third preset humidity range, and then the plurality of operative configurations of the air output structure 120 may adapt to the change of a different ambient temperature and a different ambient humidity to ensure that the air conditioner 100 rapidly and effectively adjusts the ambient temperature and the ambient humidity to a point that is comfortable for a user, the time for reaching the point that is comfortable in a room is shortened, and the user experience for the comfort level is improved.

Further, when the temperature difference is within the first preset temperature range, or the humidity difference is within the first preset humidity range, it is proven that, at the moment, the difference of the indoor ambient temperature and a comfortable temperature value is greater, or the difference of the ambient humidity and a comfortable humidity value is greater, by switching the air output structure 120 to work in the third operative configuration to increase the cooling capacity and the amount of air output, the temperature or the humidity may be reduced rapidly, then, the ambient temperature and the ambient humidity may rapidly meet demands of a user, and the point that is comfortable for the user may be increased. When the temperature difference is within the second preset temperature range, and the humidity difference is within the second preset humidity range or the third preset humidity range, it is proven that, at the moment, the difference of the indoor ambient temperature and the comfortable temperature value is moderate, and the difference of the ambient humidity and the comfortable humidity value is moderate or smaller, by switching the air output structure 120 to work in the second operative configuration to control the moderate cooling capacity and the moderate amount of air output, the ambient temperature and the ambient humidity may rapidly meet demands of the user, and the point that is comfortable for the user may be increased. When the temperature difference is within the second preset temperature range or the third preset temperature range, and the humidity difference is within the second preset humidity range, it is proven that, at the moment, the difference of the indoor ambient temperature and the comfortable temperature value is moderate or smaller, and the difference of the ambient humidity and the comfortable humidity value is moderate, by switching the air output structure 120 to work in the second operative configuration to control the moderate cooling capacity and the moderate amount of air output, the ambient temperature and the ambient humidity may rapidly meet demands of the user, and the point that is comfortable for the user may be increased. When the temperature difference is within the third preset temperature range, and the humidity difference is within the third preset humidity range, it is proven that, at the moment, the difference of the indoor ambient temperature and the comfortable temperature value is smaller, and the difference of the ambient humidity and the comfortable humidity value is smaller, by switching the air output structure 120 to work in the first operative configuration to control the smaller cooling capacity and the smaller amount of air output, the ambient temperature and the ambient humidity may rapidly meet demands of a user, and the point that is comfortable for the user may be increased.

In other words, when the temperature difference is within the first preset temperature range, or the humidity difference is within the first preset humidity range, the air outlet 112 is switched to work in the third operative configuration in which the cooling capacity is higher; when the temperature difference is not within the first preset temperature range, and the humidity difference is not within the first preset humidity range, the temperature difference is within the second preset temperature range, or the humidity difference is within the second preset humidity range, the air outlet 112 is switched to work in the second operative configuration in which the cooling capacity is moderate; and finally, when the temperature difference is within the third preset temperature range, and the humidity difference is within the third preset humidity range, the air outlet 112 is switched to work in the first operative configuration in which the cooling capacity is lower. By such an arrangement, the ambient temperature or humidity may be rapidly reduced, then, the air output structure 120 is switched to other operative configurations according to the ambient temperature and the ambient humidity, and then, the ambient temperature and the ambient humidity rapidly change to the thresholds, and then the ambient temperature and the ambient humidity rapidly reach a point that is comfortable for a user, and then, the use experience for the air conditioner 100 is improved. The cooling capacity in the third operative configuration is higher than the cooling capacity in the second operative configuration, and the cooling capacity in the second operative configuration is higher than the cooling capacity in the first operative configuration.

The first temperature difference ranges from 2° C. to 3.5° C., and the second temperature difference ranges from 0° C. to 2.5° C., wherein the first preset temperature range is greater than a first temperature difference, the second preset temperature range is greater than a second temperature difference and is smaller than or equal to the first temperature difference, and the third preset temperature range is smaller than or equal to the second temperature difference. The first temperature difference and the second temperature difference may meet other required temperature values, and the first preset temperature range, the second preset temperature range and the third preset temperature range change with the first temperature difference and the second temperature difference.

The first humidity difference ranges from 10% to 30%, and the second humidity difference ranges from 0% to 10%, wherein the first preset humidity range is greater than a first humidity difference, the second preset humidity range is greater than a second humidity difference and is smaller than or equal to the first humidity difference, and the third preset humidity range is smaller than or equal to the second humidity difference. The first humidity difference and the second humidity difference may meet other required humidity values, and the first preset humidity range, the second preset humidity range and the third preset humidity range change with the first humidity difference and the second humidity difference.

The temperature threshold ranges from 25° C. to 27° C., and the humidity threshold ranges from 40% to 60%. When the indoor ambient temperature reaches 25° C. to 27° C., and the ambient humidity reaches 40% to 60%, a user feels more comfortable. The temperature threshold is a temperature which is comfortable for the human body, and the humidity threshold is a humidity which is comfortable for the human body. It may be understood that the temperature threshold and the humidity threshold may be correspondingly increased for people such as the old and children who are weaker. Therefore, the temperature threshold and the humidity threshold may be freely set according to actual demands of a user and are not limited to the above-mentioned range.

As shown in FIGS. 1 to 8, in an embodiment of the present disclosure, the air output structure 120 includes a first air deflector 122 rotatably connected to the air conditioner body 110 and configured to open or close the air outlet 112, and the first air deflector 122 being provided with a through hole suitable for allowing an air flow to pass through; and an air diffusing structure 124 connected to the air conditioner body 110 and suitable for moving relative to the air conditioner body 110 to shield or open the air outlet 112, the air diffusing structure 124 being formed with an air diffusing structure 124, and the air diffusing structure 124 being suitable for allowing an air flow to pass through and being further suitable for enabling the passed air flow to dissipate and flow.

In this embodiment, as shown in FIGS. 1, 3, 5, 7 and 8, the air output structure 120 includes the first air deflector 122 and the air diffusing structure 124. By disposing the first air deflector 122, the air outlet 112 of the air conditioner 100 may be opened or closed. Moreover, the first air deflector 122 is provided with the through hole suitable for allowing the air flow to pass through, and then the buffering effect of the first air deflector 122 on guiding the air flow is further improved, and the air flow is enabled to more steady and smoother. The air diffusing structure 124 is connected to the air conditioner body 110 and is suitable for rotating relative to the air conditioner body 110 to shield or open the air outlet 112 opened by the first air deflector 122. When the air outlet 112 is shielded by the air diffusing structure 124, the air flow may pass by the air diffusing structure 124 disposed on the air conditioner body 110, and the air flow passing through the air diffusing structure 124 may be dissipated by the air diffusing structure to form "disordered" air output in a "random wind direction", and then the air flow is prevented from being directly blown to a human body, direct blowing is relieved, and the windless feeling demand of a user on the air conditioner is met.

Further, the air output structure 120 further includes a second air deflector 126 disposed in the air outlet 112, and the second air deflector 126 is suitable for rotating relative to a direction of the air outlet 112 and then change an air supply direction of the air outlet 112. By disposing the second air deflector 126 in the air outlet 112, the second air deflector may rotate along an axis parallel to the air outlet 112, thereby changing the air supply direction of the air outlet 112, and achieving air supply in different directions such as "far" air supply or "near" air supply.

Further, the air conditioner body 110 includes a housing, the housing is provided with a front side wall and a lower side wall, and the air outlet 112 is formed on a transition position of the front side wall of the housing and the lower side wall of the housing.

The air outlet 112 faces the "lower front" side of the air conditioner 100. That is, for a wall-mounted air conditioner 100 installed to according to a standard, the air outlet 112 includes a first-direction air outlet approximately in a horizontal direction and a second-direction air outlet approximately in a vertical direction, wherein the first-direction air outlet faces a direction corresponding to the front side wall, namely the front of the air conditioner 100, and the second-direction air outlet faces a direction corresponding to the lower side wall, namely the downside of the air conditioner 100. By adjusting the components of the amount of air output of the air outlet 112 in the first direction and the second direction, it may be ensured that the output air may not be directly blown to the human body, the overall amount of air output of the air conditioner 100 may be increased on the premise that it is windless feeling, and the cooling or heating efficiency of the air conditioner 100 may be increased.

Further, the housing further includes a left end cover and a right end cover, and side air outlets 112 are respectively provided in the left end cover and the right end cover and then achieve lateral air output.

Figure 4:
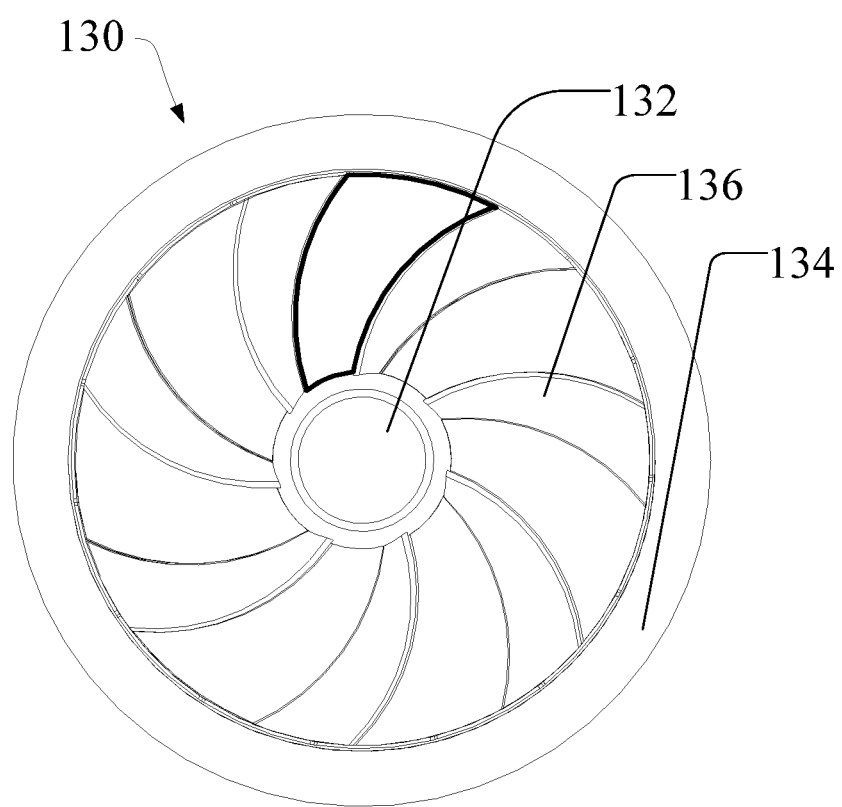
FIG. 4 is a schematic view showing a position of the wind wheel of the air conditioner shown in FIG. 3.
Figure 6:
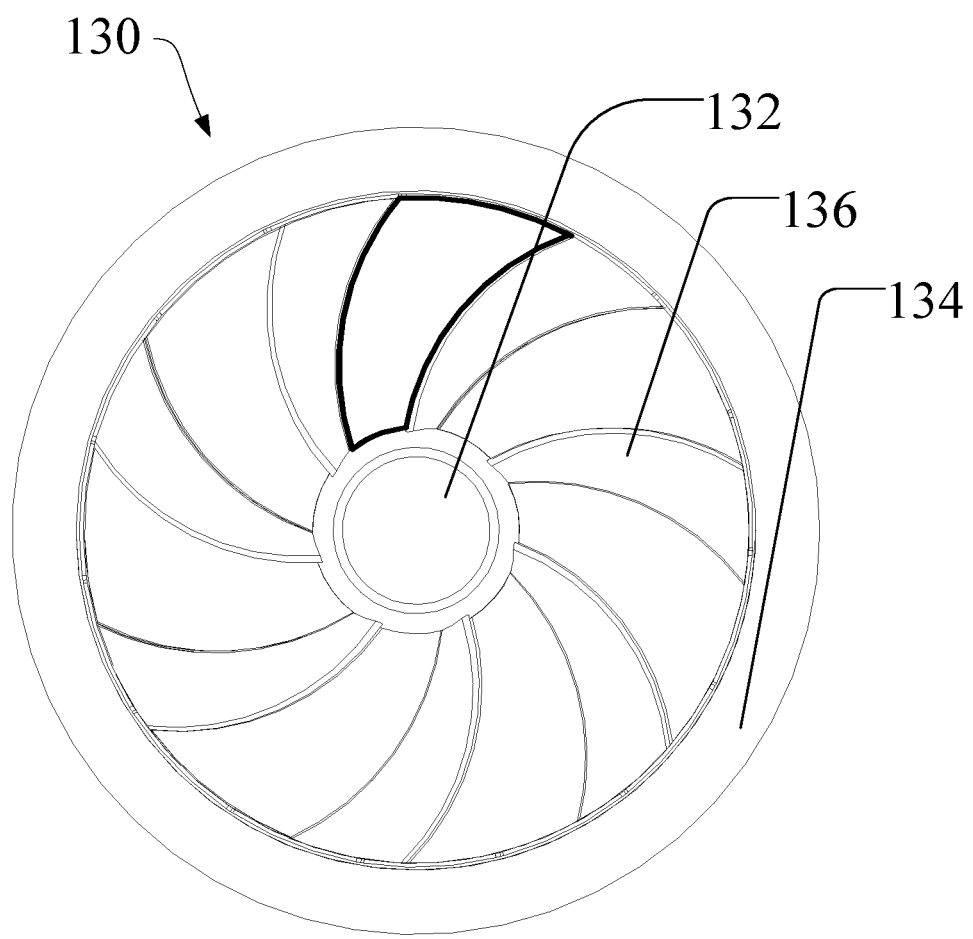
FIG. 6 is a schematic view showing a position of the wind wheel of the air conditioner shown in FIG. 5.

Further, as shown in FIGS. 2, 4 and 6, the air diffusing structure 124 includes a plurality of wind wheels 130. The plurality of wind wheels 130 are engaged and driven by a gear structure, each wind wheel 130 includes an inner rib 132 and an outer ring rib 134, a first blade group 136 and a second blade group 138 are disposed between the inner rib 132 and the outer ring rib 134, blades in the first blade group 136 are fixedly connected to the inner rib 132 and the outer ring rib 134, the second blade group 138 is rotatably connected to the inner rib 132, and the second blade group 138 is provided with a first position and a second position; wherein when the second blade group 138 is located on the first position, a plurality of blades in the second blade group 138 and the plurality of blades in the first blade group 136 are arranged at intervals; and when the second blade group 138 is located on the second position, the blades in the second blade group 138 and the blades in the first blade group 136 at least partially overlap in the axial directions of the wind wheels 130.

The air diffusing structure 124 includes the plurality of wind wheels 130. The plurality of wind wheels 130 are engaged and driven by the gear structure to achieve the linkage of the plurality of wind wheels. By disposing the first blade group 136 and the second blade group 138, the air flow passing by the air diffusing structure 124 is dissipated, and thus, a windless feeling effect is achieved. Each of the first blade group 136 and the second blade group 138 includes a plurality of blades, and when an air flow flows through the first blade group 136 and the second blade group 138, the air flow is dissipated due to the obstruction of the plurality of blades to form the "disordered" air output in the "random wind direction", and then the windless feeling effect is achieved. The blades in the first blade group 136 are fixedly connected to the inner rib 132 and the outer ring rib 134, the second blade group 138 is rotatably connected to the inner rib 132, that is, the second blade group 138 may rotate relative to the first blade group 136. Meanwhile, the second blade group 138 is provided with the first position and the second position. When the second blade group 138 is located on the first position, the plurality of blades in the second blade group 138 and the plurality of blades in the first blade group 136 are arranged at intervals, and the blades which are disposed at intervals may increase the coverage area of the blades of the blade groups, thereby reducing the circulation area of the air flow and achieving weaker air delivery. When the second blade group 138 is located on the second position, the blades in the second blade group 138 and the blades in the first blade group 136 at least partially overlap in the axial directions of the wind wheels 130; and when the two groups of blades partially overlap, the coverage area of the blades is reduced, and then the circulation area of the air flow is increased, and then, stronger air delivery is achieved.

Further, when the first operative configuration of the air output structure 120 is formed, the air outlet 112 is opened by the first air deflector 122, the air diffusing structure 124 is abutted against the first air deflector 122 and shields the air outlet 112, and the second blade group 138 moves to the first position.

As shown in FIGS. 1 and 2, when the first operative configuration of the air output structure 120 is formed, that is, the first air deflector 122 and the air diffusing structure 124 of the air output structure 120 are located at the windless feeling default angle, the first air deflector 122 rotates and opens the air outlet 112, the air diffusing structure 124 rotates to be abutted against the first air deflector 122 and shields the air outlet 112, and the second blade group 138 moves to the first position. At the moment, the blades in the first blade group 136 and the second blade group 138 are arranged at intervals, and the circulation area of the air flow is small, and then a working form in which the cooling capacity is lower is achieved, and the demand on the cooling capacity when the difference of an indoor ambient temperature and a comfortable temperature value is smaller and the difference of the ambient humidity and a comfortable humidity value is smaller may be met.

Figure 3:
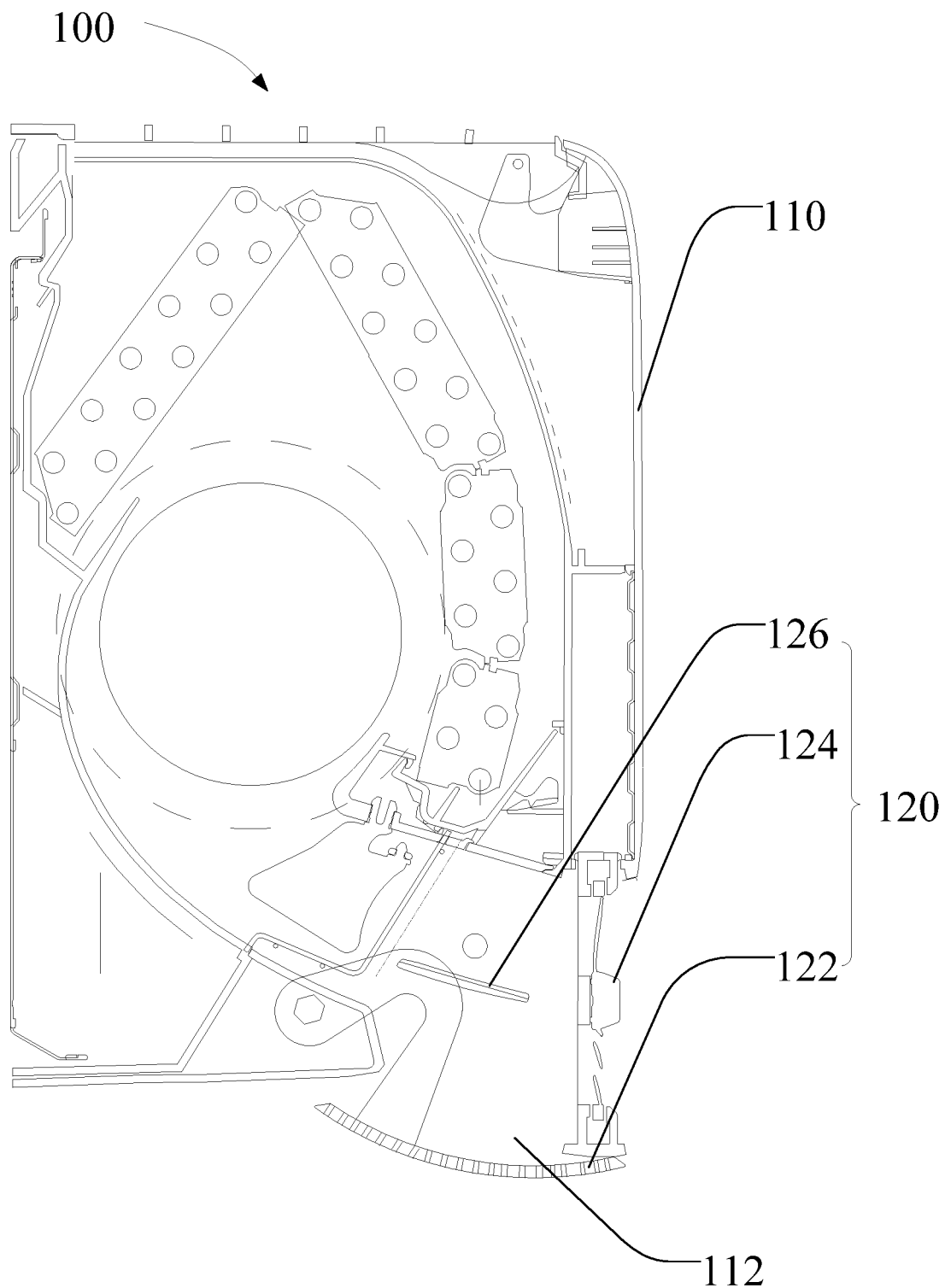
FIG. 3 is a schematic structural view of the air conditioner with the air output structure in a second operative configuration.

Further, as shown in FIGS. 3 and 4, when the second operative configuration of the air output structure 120 is formed, the air outlet 112 is opened by the first air deflector 122, the air diffusing structure 124 is abutted against the first air deflector 122 and shields the air outlet 112, and the second blade group 138 moves to the second position.

When the second operative configuration of the air output structure 120 is formed, the first air deflector 122 and the air diffusing structure 124 of the air output structure 120 are located at the second windless feeling angle, at the moment, the air outlet 112 is opened by the first air deflector 122, the air diffusing structure 124 is abutted against the first air deflector 122 and shields the air outlet 112, and the second blade group 138 moves to the second position. At the moment, the blades in the first blade group 136 and the second blade group 138 at least partially overlap, and the circulation area of the air flow is increased, and then a working form in which the cooling capacity is moderate is achieved, and the demand on the cooling capacity when the difference of an indoor ambient temperature and a comfortable temperature value is moderate or smaller, and the difference of the ambient humidity and a comfortable humidity value is moderate, or the demand on the cooling capacity when the difference of the indoor ambient temperature and the comfortable temperature value is moderate, and the difference of the ambient humidity and a comfortable humidity value is moderate or smaller may be met.

Figure 5:
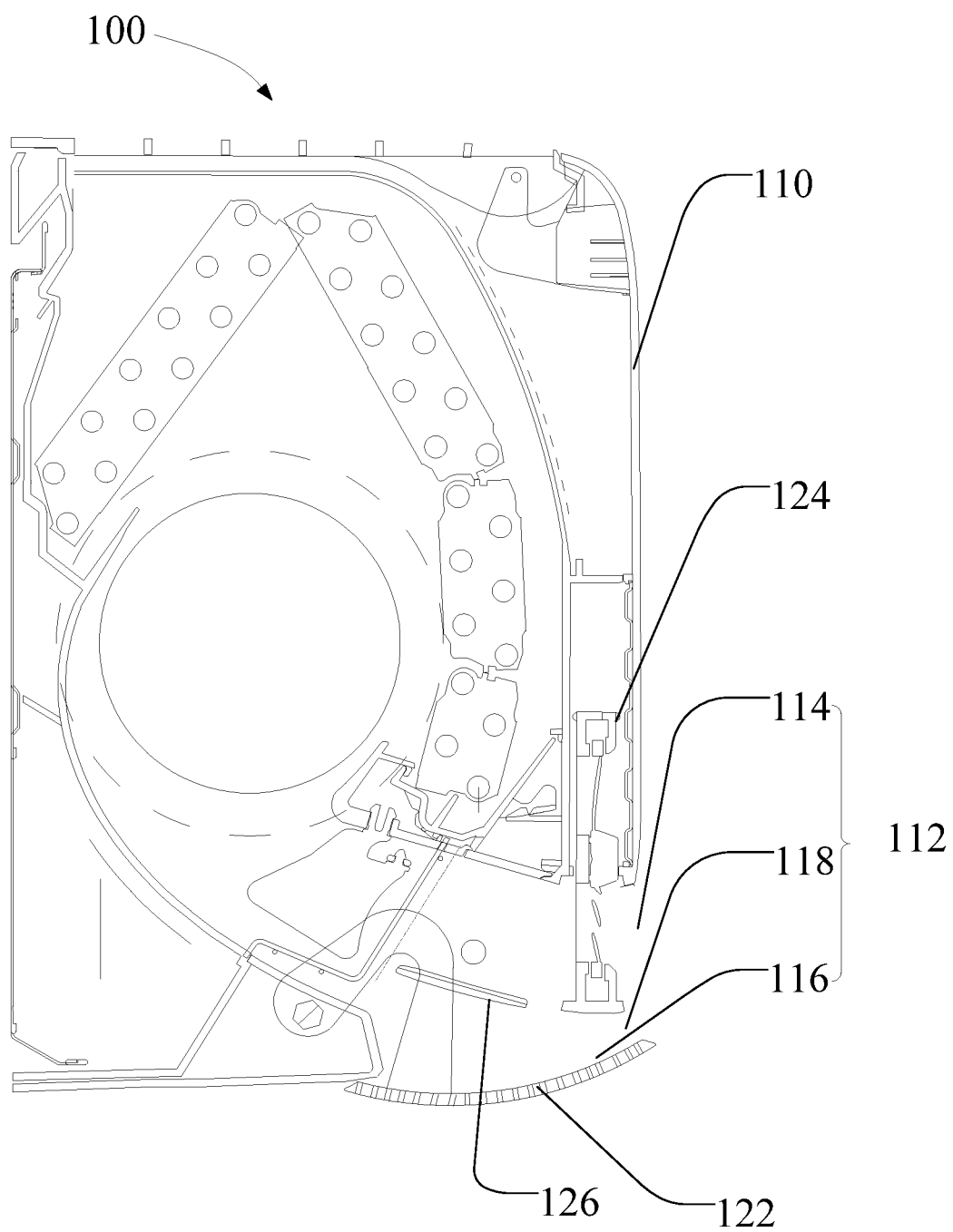
FIG. 5 is a schematic structural view of the air conditioner with the air output structure in a third operative configuration.

Further, as shown in FIGS. 5 and 6, when the third operative configuration of the air output structure 120 is formed, the air outlet 112 includes a first part of air outlet 114, a second part of air outlet 116, and a third part of air outlet 118, the first part of air outlet 114 is closed by the first air deflector 122, the second part of air outlet 116 is shielded by the air diffusing structure 124, the third part of air outlet 118 is formed between the first air deflector 122 and the air diffusing structure 124, and the second blade group 138 moves to the second position.

When the third operative configuration of the air output structure 120 is formed, it is proven that the air conditioner 100 needs to work under higher cooling capacity and greater circulation of the air flow, at the moment, the air outlet 112 includes the first part of air outlet 114, the second part of air outlet 116, and the third part of air outlet 118, the first part of air outlet 114 is closed by the first air deflector 122, the second part of air outlet 116 is shielded by the air diffusing structure 124, and the third part of air outlet 118 is formed between the first air deflector 122 and the air diffusing structure 124. At the moment, a part of the air flow blown from the air outlet 112 flows through the air diffusing structure 124 to achieve windless feeling air output, another part of the air flow directly flows through the third part of air outlet 118 to achieve rapid cooling, and further part of the air flow flows through the through hole of the first air deflector 122. By such an arrangement, it is ensured that a sufficient air flow flows out to achieve rapid cooling and rapid temperature and humidity reduction, meanwhile, the phenomenon that user experience is affected by direct blowing of the air flow due to over high air flow may be avoided, and windless feeling air output is achieved; and the demand on the cooling capacity when the difference of an indoor ambient temperature and a comfortable temperature value is greater, or the difference of the ambient humidity and a comfortable humidity value is greater may be met, and meanwhile, windless feeling air output is achieved.

Further, circulation is formed by a positive pressure at the air outlet 112 and a negative pressure at a return air inlet in the windless feeling mode of the air conditioner 100, and due to smaller air volume, a room is poor in spatial circulation and is easily stuffy. Therefore, when the air output structure 120 works in the third operative configuration, a part of the air flow blown from the air outlet 112 flows through the air diffusing structure 124 to achieve windless feeling air output, namely air output with a small air volume, another part of the air flow directly flows through the third part of air outlet 118 to achieve air output with a great air volume, and further part of the air flow flows through the through hole of the first air deflector 122 to achieve air output with a small air volume. Air flow exchange on far and near positions in the room may be promoted, then, the circulation efficiency of the air flow is increased, and the comfort level in the room is increased.

Figure 7:
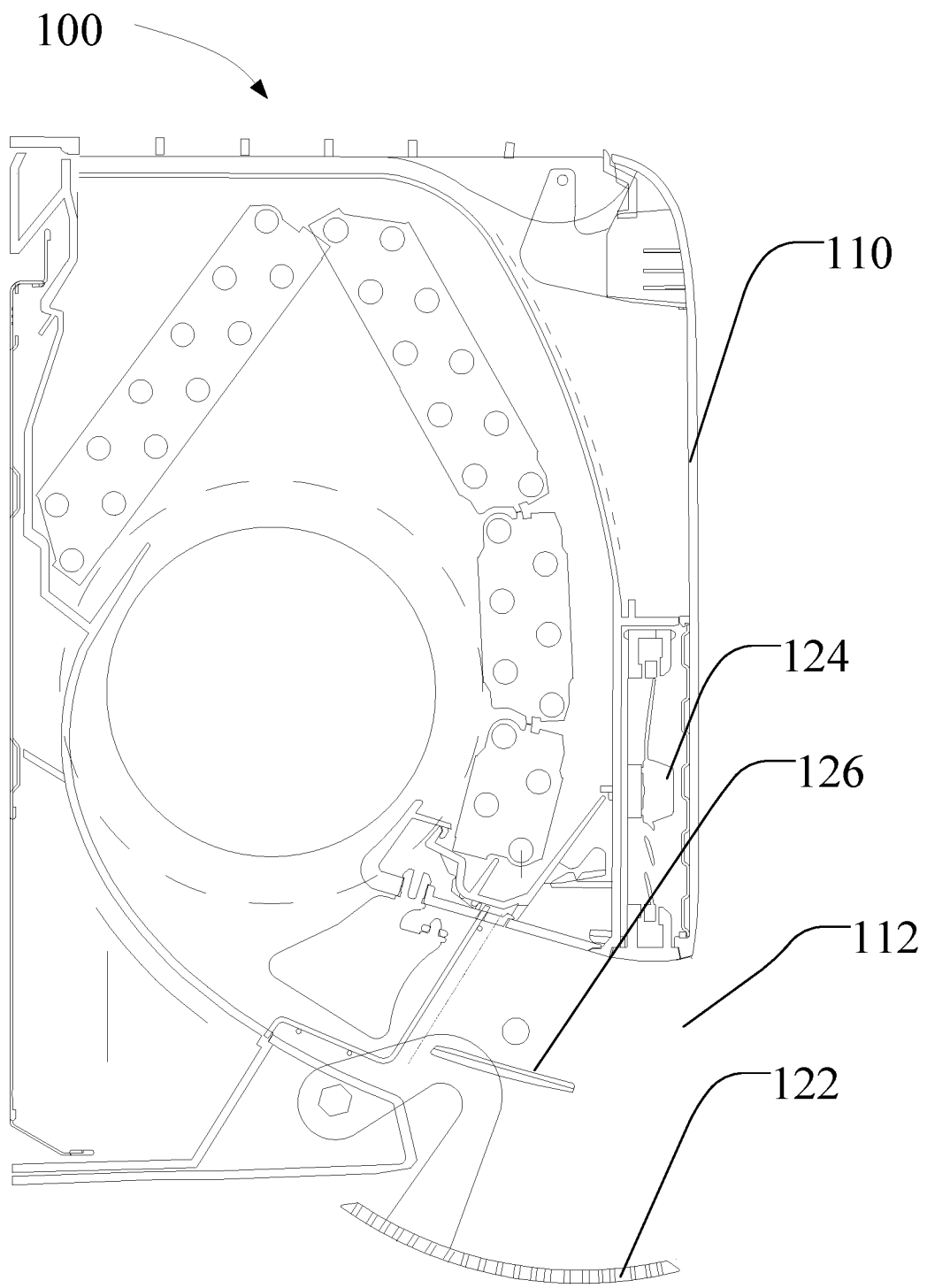
FIG. 7 is a schematic structural view of the air conditioner with the air output structure in a fourth operative configuration.

Further, as shown in FIG. 7, the air output structure further includes a fourth operative configuration which is suitable for a normal cooling state. That is, in a state that a windless feeling signal is not acquired, when the air output structure is in the fourth state, the air outlet is opened by the first air deflector and a heat radiation assembly, at the moment, the cooling capacity is highest.

Figure 8:
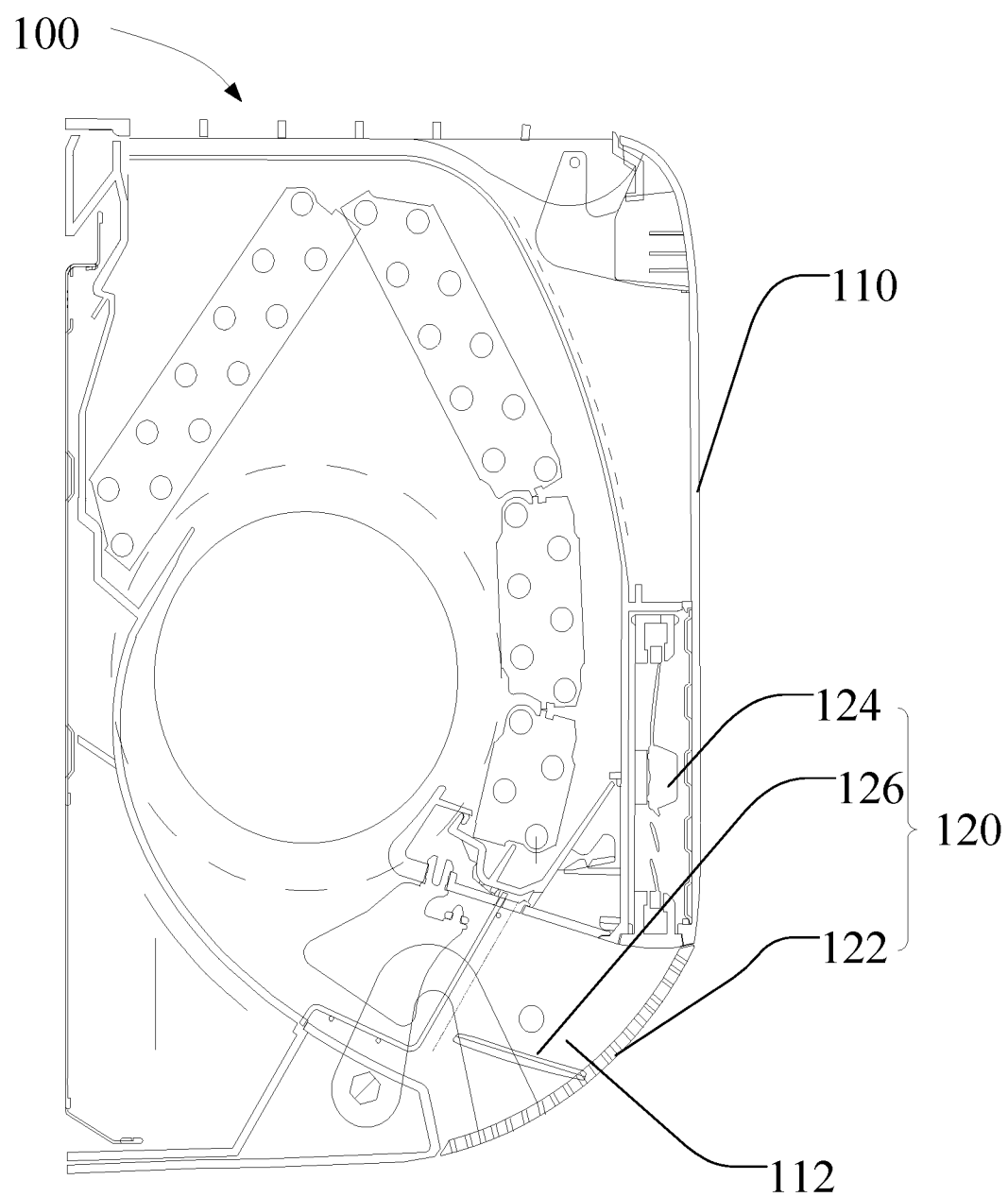
FIG. 8 is a schematic structural view of the air conditioner with the air output structure in a fifth operative configuration.

As shown in FIG. 8, the air output structure further includes a fifth operative configuration, namely a state of the air output structure when the air conditioner is shut down. When the air output structure is in the fifth operative configuration, the air outlet is closed by the first air deflector.

As shown in FIGS. 5 to 8, on the basis of the embodiment 3 as above, further, the first air deflector 122 and the air diffusing structure 124 are spliced to define an included-angle-shaped cavity located on the outer side of the air outlet 112 of the air conditioner and communicating with the air outlet 112 of the air conditioner, the cavity is formed with side openings respectively along two ends of a length direction of a splicing line of the first air deflector 122 and the air diffusing structure 124, and the side openings communicate with the cavity.

In this embodiment, the first air deflector 122 and the air diffusing structure 124 are spliced to define the included-angle-shaped cavity which is located on the outer side of the air outlet 112 and communicates with the air outlet 112. The cavity is formed with the side openings respectively along two ends (namely the left and right sides of the air conditioner 100) of the length direction of the splicing line of the first air deflector 122 and the air diffusing structure 124, and the side openings communicate with the cavity and are used for achieving "lateral" air output. When the air conditioner 100 is installed, the "front side" of the air conditioner often faces an activity area of indoor personnel, and therefore, the "lateral" air output may effectively avoid direct blowing of the air blown from the air conditioner 100 to the human body and improve the user experience of the air conditioner 100. In some implementations, side blowers may further be disposed on the side openings to ensure the amount of air output at sides.

In an exemplary embodiment of the present disclosure, a user starts an air conditioner and selects a cooling mode to operate, and an air supply assembly operates at a cooling angle. After a windless feeling functional signal is received, the air supply assembly swings from the cooling angle to the windless feeling default angle, at the moment, the wind wheels 130 are located on staggered positions.

An ambient temperature and an ambient humidity of a room are measured, a temperature difference of the ambient temperature and a temperature threshold (comfortable temperature) and a humidity difference of the ambient humidity and a humidity threshold (comfortable humidity) are calculated, and if the temperature difference of the ambient temperature and the comfortable temperature of the room is greater than a first preset temperature difference, or the humidity difference of the ambient humidity and the comfortable humidity of the room is greater than a first preset humidity difference, the air output structure 120 swings from the windless feeling default angle to the third windless feeling angle, that is, the air output structure 120 is switched from the first operative configuration to the third operative configuration.

If the temperature difference of the ambient temperature and the comfortable temperature of the room is smaller than the first preset temperature difference and is greater than a second preset temperature difference, or the difference of the ambient humidity and the comfortable humidity of the room is smaller than or equal to a first preset humidity difference and is greater than a second preset humidity difference, the air output structure 120 swings to the second windless feeling angle, that is, the air output structure 120 is switched to the third operative configuration to work, at the moment, swirl blades are located on overlapping positions.

If the difference of the ambient temperature and the comfortable temperature of the room is smaller than or equal to the second preset temperature difference, and the difference of the ambient humidity and the comfortable humidity of the room is smaller than or equal to the second preset humidity difference, the air output structure 120 swings to the windless feeling default angle, that is, the air output structure 120 works in the first operative configuration.

In some implementations, the heat exchange capability of a system is lowered as a whole in the windless feeling mode, which causes incapability of sufficiently discharging cold air due to centralization of the cold air in an indoor heat exchanger. The air conditioner may be controlled to increase the amount of downward (a direction facing the ground) air output, the discharging efficiency of the cold air may be increased by virtue of the downward flowing tendency of the cold air, and thus, the system performance may be improved.

In some cases, by adopting the windless feeling mode, it is possible that circulation is formed near the air conditioner due to a positive pressure at the air outlet 112 and a negative pressure at a return air inlet, by which the overall air volume is reduced, the overall circulation in the room becomes poor, and a user feels "stuffy".

In order to solve the above-mentioned problems, differential air supply, a mode that a part of air is supplied with a great air volume, and the other part of air is supplied with a small air volume, may be adopted, and thus the air flow exchange on far and near positions of the room is promoted.

Figure 9:
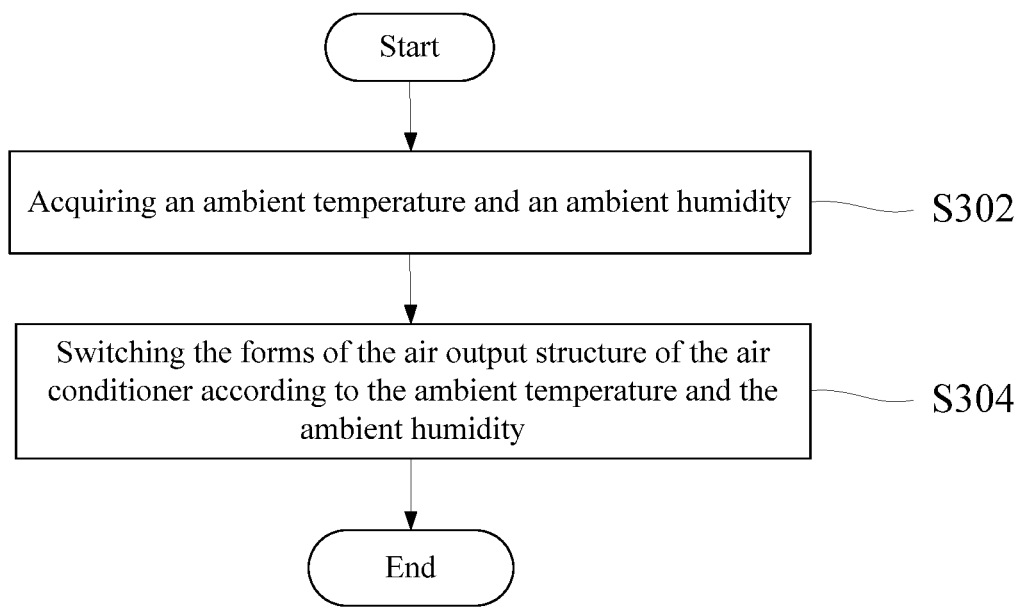
FIG. 9 is a schematic process view of a control method for an air conditioner according to an embodiment of the present disclosure.

As shown in FIG. 9, an embodiment of the present disclosure provides a control method for an air conditioner, which is used for controlling the air conditioner according to any one of the above-mentioned embodiments. The control method includes:

step S302: an ambient temperature and an ambient humidity are acquired; and step S304: the operative configurations of the air output structure of the air conditioner are switched according to the ambient temperature and the ambient humidity.

According to the control method for the air conditioner provided by the present disclosure, an ambient temperature and an ambient humidity of an environment where the air conditioner is located are acquired by the detection device, and the controller switches the operative configurations of the air output structure according to the ambient temperature and the ambient humidity acquired by the detection device and then adjust the air output angle of the air outlet and cause the air output angle and the amount of air output to be matched with the current ambient temperature and the current ambient humidity, thereby being able to cause, after the air conditioner has switched to a different working mode, the ambient temperature and the ambient humidity to rapidly reach a point that is comfortable for the human body, and then, improving the use experience for the air conditioner.

Further, the plurality of operative configurations of the air output structure may adapt to the change of a different ambient temperature and a different ambient humidity. By switching the operative configurations of the air output structure according to the ambient temperature and the ambient humidity, and then, adjusting the air output direction and the cooling capacity, it may be ensured that the air conditioner rapidly and effectively adjusts the ambient temperature and the ambient humidity to a point that is comfortable for a user, and the comfort level of the air conditioner is further improved. The plurality of operative configurations of the air output structure may meet the demands on normal air output and windless feeling air output of the air conditioner, and then the operative configurations of the air output structure are switched according to the demands on the normal air output and the windless feeling air output, by which the air conditioner may achieve the normal air output and the windless feeling air output, then, rapid cooling is achieved under the condition of the normal air output, the comfort level is improved under the condition of the windless feeling air output, and then, the function of the product is expanded. Further, the plurality of operative configurations of the air output structure may further meet the demands on the different ambient temperature and the different ambient humidity when the air conditioner is in the state of windless feeling air output, and then the operative configurations of the air output structure are switched according to the demands on the ambient temperature and the ambient humidity to achieve rapid cooling in a room and windless feeling experience, meanwhile, the ambient temperature and the ambient humidity rapidly reach a point that is comfortable for a user, and then, the use experience for a higher comfort level is achieved. By setting the plurality of operative configurations of the air output structure, the demands on different environments and different air output energy are met, and the use range of the product is widened.

The plurality of operative configurations of the air output structure include the first operative configuration. The control method further includes: a control instruction is received, and the air output structure is controlled to work in the first operative configuration according to the control instruction.

By disposing the communication interface in the air conditioner and connecting the communication interface to the controller, the communication interface receives the control instruction sent by a user, the controller controls the air output structure to work in the first operative configuration according to the control instruction, and then, the air output angle and the amount of air output achieved under the condition that the air output structure works in the first operative configuration may meet demands of the corresponding control instruction on the heat exchange capability and the amount of air output of the air conditioner, and then the ambient temperature and the ambient humidity rapidly reach a point that is comfortable for a user, and the use experience of the user is improved.

The control instruction is a windless feeling instruction. The first operative configuration in the plurality of operative configurations is a windless feeling default form, and the controller controls the air output structure to work in the first operative configuration according to the windless feeling instruction, and then the air output angle and the amount of air output achieved when the air output structure works in the first operative configuration may meet the demand of a user on windless feeling air output, that is, the air output by the air conditioner is closer to natural wind, the uniformity of the temperature in a room is improved while the amount of air output and the cooling capacity are guaranteed, and the use experience for the air conditioner is improved. Meanwhile, the controller controls the air output structure to be immediately switched to work in the first operative configuration according to the windless feeling instruction, which is beneficial to the assurance that the ambient temperature and the ambient humidity rapidly reach a point that is comfortable for the user.

Figure 10:
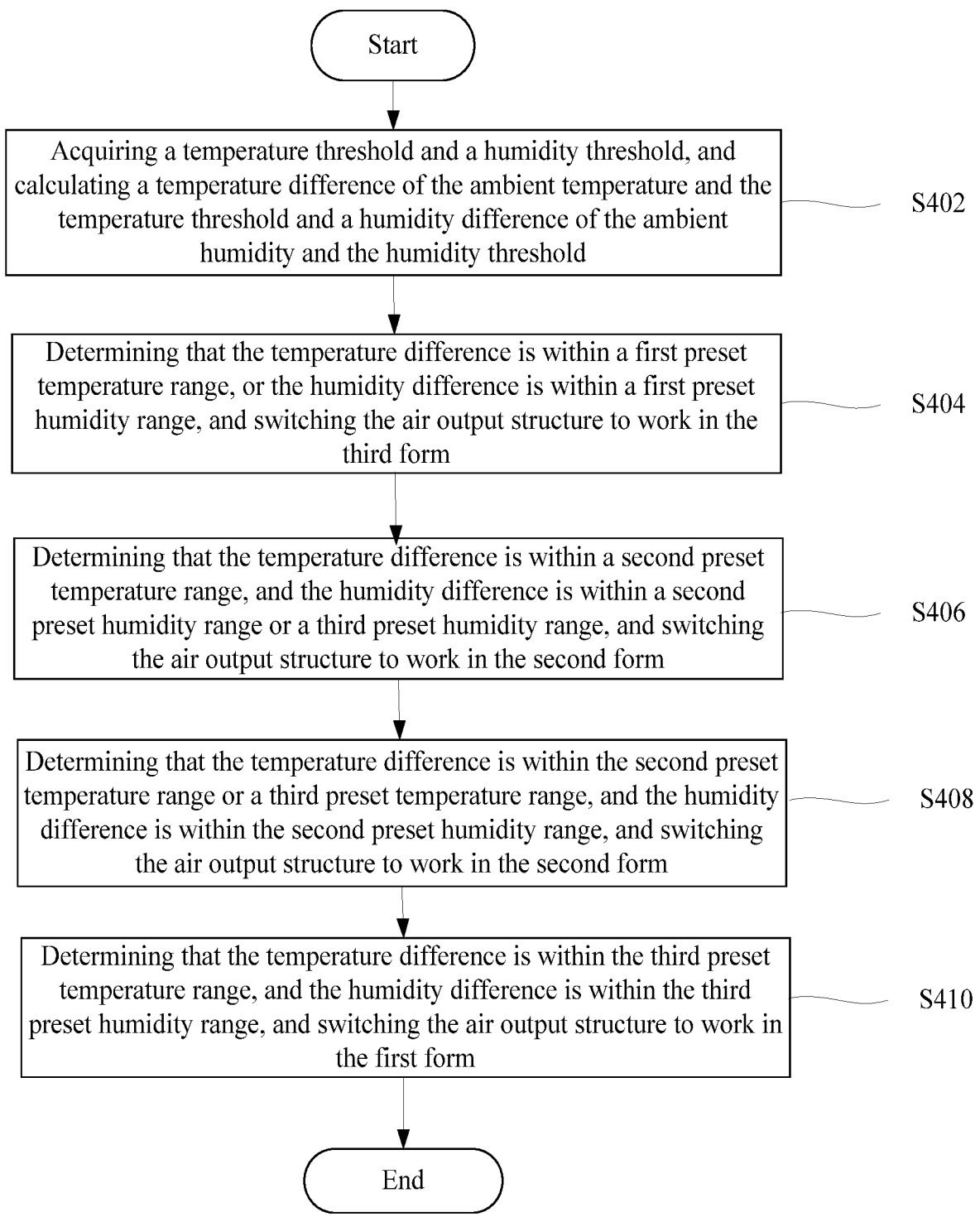
FIG. 10 is another schematic process view of the control method.

Further, the plurality of operative configurations further include a second operative configuration and a third operative configuration. As shown in FIG. 10, the step of the operative configurations of the air output structure of the air conditioner are switched according to the ambient temperature and the ambient humidity can include:

- step S402: acquiring a temperature threshold and a humidity threshold, and calculating a temperature difference of the ambient temperature and the temperature threshold and a humidity difference of the ambient humidity and the humidity threshold;
- step S404: determining that the temperature difference is within a first preset temperature range, or the humidity difference is within a first preset humidity range, and switching the air output structure to work in the third operative configuration;
- step S406: determining that the temperature difference is within a second preset temperature range, and the humidity difference is within a second preset humidity range or a third preset humidity range, and switching the air output structure to work in the second operative configuration;
- step S408: determining that the temperature difference is within the second preset temperature range or a third preset temperature range, and the humidity difference is within the second preset humidity range, and switching the air output structure to work in the second operative configuration; and
- step S410: determining that the temperature difference is within the third preset temperature range, and the humidity difference is within the third preset humidity range, and switching the air output structure to work in the first operative configuration.

In this embodiment, the first operative configuration shows a windless feeling default angle, the second operative configuration shows a second windless feeling angle, and the third operative configuration shows a third windless feeling angle.

The first operative configuration shows the windless feeling default angle, the second operative configuration shows the second windless feeling angle, and the third operative configuration shows the third windless feeling angle.

The temperature threshold and the humidity threshold are acquired, the difference of the ambient temperature and the temperature threshold is calculated to obtain the temperature difference, and the difference of the ambient humidity and the humidity threshold is calculated to obtain the humidity difference; the temperature difference is compared with the preset temperature ranges, and the humidity difference is compared with the preset humidity ranges, wherein the preset temperature ranges at least include the first preset temperature range, the second preset temperature range, and the third preset temperature range, and the preset humidity ranges at least include the first preset humidity range, the second preset humidity range, and the third preset humidity range; and the operative configurations of the air output structure are switched according to a result achieved by comparing the temperature difference with the first preset temperature range, the second preset temperature range, and the third preset temperature range, and a result achieved by comparing the humidity difference with the first preset humidity range, the second preset humidity range, and the third preset humidity range, and then the plurality of operative configurations of the air output structure may adapt to the change of a different ambient temperature and a different ambient humidity to ensure that the air conditioner rapidly and effectively adjusts the ambient temperature and the ambient humidity to a point that is comfortable for a user, the time for reaching the point that is comfortable in a room is shortened, and the user experience for the comfort level is improved.

When the temperature difference is within the first preset temperature range, or the humidity difference is within the first preset humidity range, it is proven that, at the moment, the difference of the indoor ambient temperature and a comfortable temperature value is greater, or the difference of the ambient humidity and a comfortable humidity value is greater, by switching the air output structure to work in the third operative configuration to increase the cooling capacity and the amount of air output, the temperature or the humidity may be reduced rapidly, then, the ambient temperature and the ambient humidity may rapidly meet demands of a user, and the point that is comfortable for the user may be increased. When the temperature difference is within the second preset temperature range, and the humidity difference is within the second preset humidity range or the third preset humidity range, it is proven that, at the moment, the difference of the indoor ambient temperature and the comfortable temperature value is moderate, and the difference of the ambient humidity and the comfortable humidity value is moderate or smaller, by switching the air output structure to work in the second operative configuration to control the moderate cooling capacity and the moderate amount of air output, the ambient temperature and the ambient humidity may rapidly meet demands of the user, and the point that is comfortable for the user may be increased. When the temperature difference is within the second preset temperature range or the third preset temperature range, and the humidity difference is within the second preset humidity range, it is proven that, at the moment, the difference of the indoor ambient temperature and the comfortable temperature value is moderate or smaller, and the difference of the ambient humidity and the comfortable humidity value is moderate, by switching the air output structure to work in the second operative configuration to control the moderate cooling capacity and the moderate amount of air output, the ambient temperature and the ambient humidity may rapidly meet demands of the user, and the point that is comfortable for the user may be increased. When the temperature difference is within the third preset temperature range, and the humidity difference is within the third preset humidity range, it is proven that, at the moment, the difference of the indoor ambient temperature and the comfortable temperature value is smaller, and the difference of the ambient humidity and the comfortable humidity value is smaller, by switching the air output structure to work in the first operative configuration to control the smaller cooling capacity and the smaller amount of air output, the ambient temperature and the ambient humidity may rapidly meet demands of a user, and the point that is comfortable for the user may be increased.

In other words, when the temperature difference is within the first preset temperature range, or the humidity difference is within the first preset humidity range, the air outlet is switched to work in the third operative configuration in which the cooling capacity is higher; when the temperature difference is not within the first preset temperature range, and the humidity difference is not within the first preset humidity range, the temperature difference is within the second preset temperature range, or the humidity difference is within the second preset humidity range, the air outlet is switched to work in the second operative configuration in which the cooling capacity is moderate; and finally, when the temperature difference is within the third preset temperature range, and the humidity difference is within the third preset humidity range, the air outlet is switched to work in the first operative configuration in which the cooling capacity is lower. By such an arrangement, the ambient temperature or humidity may be rapidly reduced, then, other working states are switched according to the ambient temperature and the ambient humidity, and then the ambient temperature and the ambient humidity rapidly change to the thresholds, and then, the use experience for the air conditioner is improved.

The cooling capacity in the third operative configuration is higher than the cooling capacity in the second operative configuration, and the cooling capacity in the second operative configuration is higher than the cooling capacity in the first operative configuration.

The first temperature difference ranges from 2° C. to 3.5° C., and the second temperature difference ranges from 0° C. to 2.5° C., wherein the first preset temperature range is greater than a first temperature difference, the second preset temperature range is greater than a second temperature difference and is smaller than or equal to the first temperature difference, and the third preset temperature range is smaller than or equal to the second temperature difference. The first temperature difference and the second temperature difference may meet other required temperature values, and the first preset temperature range, the second preset temperature range and the third preset temperature range change with the first temperature difference and the second temperature difference.

The first humidity difference ranges from 10% to 30%, and the second humidity difference ranges from 0% to 10%, wherein the first preset humidity range is greater than a first humidity difference, the second preset humidity range is greater than a second humidity difference and is smaller than or equal to the first humidity difference, and the third preset humidity range is smaller than or equal to the second humidity difference. The first humidity difference and the second humidity difference may meet other required humidity values, and the first preset humidity range, the second preset humidity range and the third preset humidity range change with the first humidity difference and the second humidity difference.

The temperature threshold ranges from 25° C. to 27° C., and the humidity threshold ranges from 40% to 60%. When the indoor ambient temperature reaches 25° C. to 27° C., and the ambient humidity reaches 40% to 60%, a user feels more comfortable.

Figure 11:
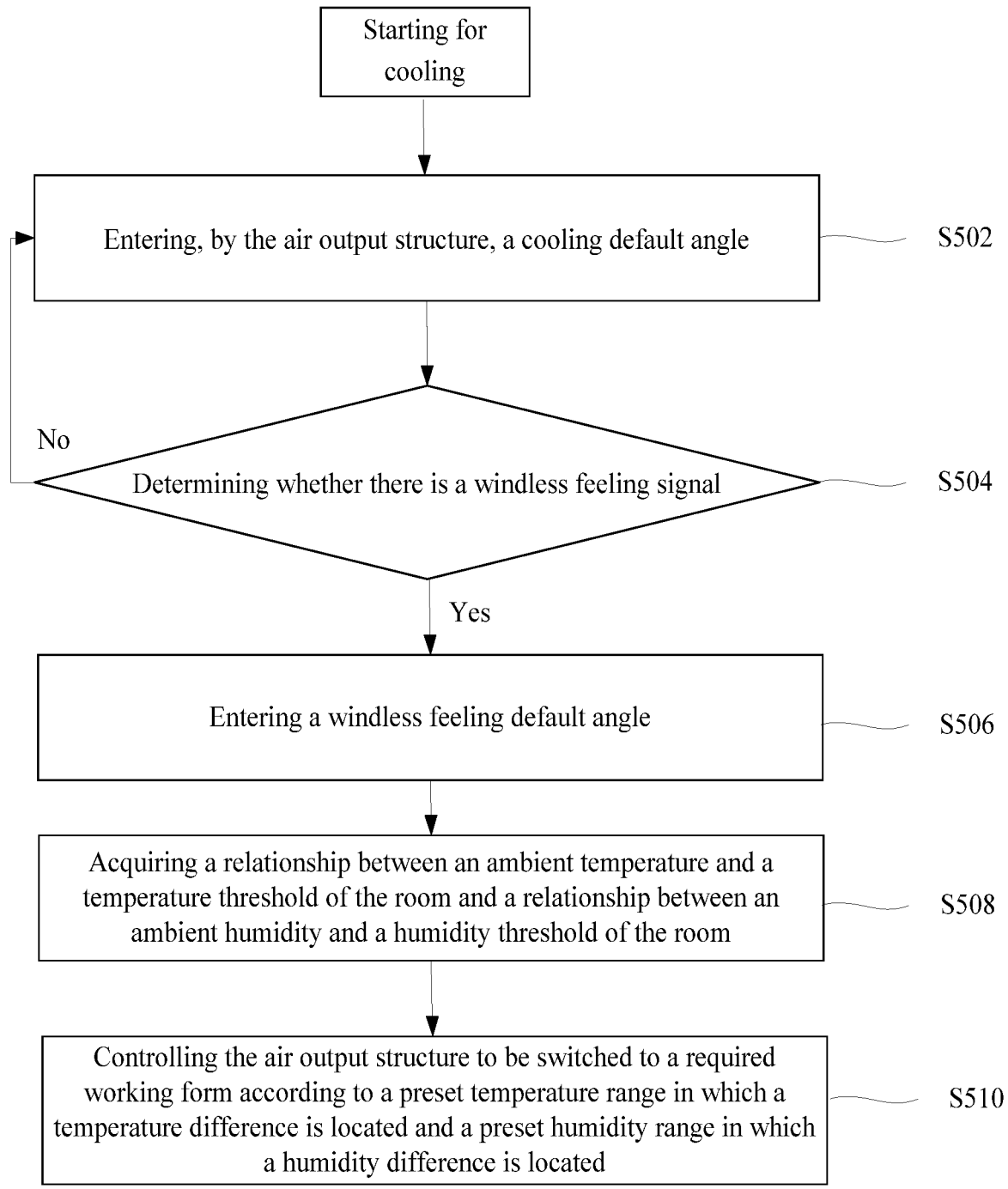
FIG. 11 is another schematic process view of the control method.

As shown in FIG. 11, in an exemplary embodiment, a control method for an air conditioner provided by the present disclosure includes the steps.

In an embodiment of the present disclosure, the overall logic for windless feeling control is shown ion FIG. 11 in which:

after the air conditioner is started for cooling, step S502 is performed, that is, the air output structure enters a cooling default angle;

step S504: determining whether there is a windless feeling signal, if yes, step S506 is performed, and if not, the step S502 is returned and performed;

step S506: the air output structure enters a windless feeling default angle;

step S508: acquiring a relationship between an ambient temperature and a temperature threshold of the room and a relationship between an ambient humidity and a humidity threshold of the room; and step S510: controlling the air output structure to be switched to a required working form according to a preset temperature range in which a temperature difference is located and a preset humidity range in which a humidity difference is located.

In this embodiment, a user starts the air conditioner, the air conditioner operates in a cooling mode, at the moment, the air output structure enters the cooling default angle. The air output structure is provided with a fourth operative configuration. The air output structure works in the fourth operative configuration, then, determining whether the windless feeling signal is received, if not, the air conditioner further keeps operating in the cooling form, and if yes, the air output structure is controlled to work in the first operative configuration, namely a windless feeling default form. At the moment, a detection device acquires the ambient temperature, the environment humidity, the temperature threshold and the humidity threshold, calculates the temperature difference of the ambient temperature and the temperature threshold and the humidity difference of the ambient humidity and the humidity threshold, determines the preset temperature range in which the temperature difference is located and the preset humidity range in which the humidity difference is located, and controls the air output structure to be switched to a working form suitable for the current ambient temperature and the current ambient humidity according to the preset temperature range in which the temperature difference is located and the preset humidity range in which the humidity difference is located, wherein it may be understood that the steps are performed according to the above-mentioned logic, and finally, the air conditioner stably operates in a windless feeling state.

As shown in FIG. 8, the air output structure further includes a fifth operative configuration, namely a state of the air output structure when the air conditioner is shut down. When the air output structure is in the fifth operative configuration, the air outlet is closed by the first air deflector.

As shown in FIG. 7, when the air output structure is in a fourth state, the air outlet is opened by the first air deflector and a heat radiation assembly, and at the moment, the cooling capacity is highest.

As shown in FIGS. 1 to 11, an embodiment of the present disclosure provides a computer-readable storage medium storing a computer program, wherein when the computer program is executed by a processor, the control method for the air conditioner according to any one of the above-mentioned embodiments is implemented.

The computer-readable storage medium provided by the present disclosure stores the computer program, wherein when the computer program is executed, the steps of the control method for the air conditioner according to any one of the above-mentioned embodiments is implemented. Therefore, all the beneficial technical effects of the control method for the air conditioner according to any one of the above-mentioned embodiments are achieved, the descriptions thereof are omitted herein.

In the description of the present disclosure, the term "a plurality of" refers to two or more. Unless otherwise clearly limited, directional or positional relationships indicated by terms such as "upper" and "lower" are directional or positional relationships based on the accompanying drawings, are merely intended to facilitate describing the present disclosure and simplifying the description, rather than to indicate or imply that the appointed apparatus or element has to be located in a specific direction or structured and operated in the specific direction so as not to be understood as restrictions on the present disclosure. The terms "connected to", "provided with", "fixed", etc. should be understood in a broad sense. For example, "connected to" may be a fixed connection or a detachable connection, or integral connection, or electric connection; it may be direct connection or indirect connection through an intermediate medium. The specific meaning of the above-mentioned terms in the present disclosure may be understood by those of ordinary skill in the art, as the case may be.

In the description of the present disclosure, the description of the terms "one embodiment", "some embodiments", "specific embodiments", etc. means that the specific features, structures, materials or characteristics described in conjunction with the embodiments or examples are included in at least one embodiment or example of the present disclosure. In the present disclosure, schematic representations of the above-mentioned terms do not necessarily refer to the same embodiment or example. Furthermore, the specific features, structures, materials, or characteristics described may be combined in any suitable manner in any one or more embodiments or examples.

The foregoing is only an exemplary embodiment of the present disclosure and is not intended to limit the present disclosure, as various modifications and changes therein will occur to those skilled in the art. Any modifications, equivalents, improvements, etc. that come within the spirit and principles of the present disclosure are intended to be included within the protection scope of the present disclosure.

What is claimed is:

1. An air conditioner comprising:
an air conditioner body provided with an air outlet;
an air output structure configured to switch between a plurality of operative configurations to adjust an air output of the air outlet, wherein the air output structure comprises:
  a first air deflector rotatably connected to the air conditioner body and configured to open or close the air outlet, the first air deflector being provided with a through hole for allowing an air flow to pass through; and
  an air diffusing structure configured to move into and out of the air outlet, the air diffusing structure comprising one or more structures configured to, when the air diffusing structure is moved into the air outlet, allow an air flow to pass therethrough and to dissipate the air flow;
a detection device configured to acquire an ambient temperature and an ambient humidity; and
a controller electrically connected to the air output structure and the detection device and configured to switch the operative configurations of the air output structure according to the ambient temperature and the ambient humidity.

2. The air conditioner according to claim 1,
wherein the plurality of operative configurations include a first operative configuration,
wherein the air conditioner further comprises a communication interface connected to the controller and configured to receive a control instruction, and
wherein the controller is configured to control the air output structure to be in the first operative configuration according to the control instruction.

3. The air conditioner according to claim 2,
wherein the plurality of operative configurations further include a second operative configuration and a third operative configuration, and
wherein the controller is further configured to:
  acquire a temperature threshold, and calculate a temperature difference of the ambient temperature and the temperature threshold;
  acquire a humidity threshold, and calculate a humidity difference of the ambient humidity and the humidity threshold;
  determine that the temperature difference is within a first preset temperature range, or the humidity difference is within a first preset humidity range, and switch the air output structure to be in the third operative configuration;
  determine that the temperature difference is within a second preset temperature range, or the humidity difference is within a second preset humidity range or a third preset humidity range, and switch the air output structure to be in the second operative configuration;
  determine that the temperature difference is within the second preset temperature range or a third preset temperature range, and the humidity difference is within the second preset humidity range, and switch the air output structure to be in the second operative configuration; and
  determine that the temperature difference is within the third preset temperature range, and the humidity difference is within the third preset humidity range, and switch the air output structure to be in the first operative configuration.

4. The air conditioner according to claim 1, wherein the air output structure further comprises:
a second air deflector disposed in the air outlet, the second air deflector being configured to rotate relative to a direction of the air outlet and then change an air supply direction of the air outlet.

5. The air conditioner according to claim 4, wherein:
the air conditioner body comprises a housing;
the housing comprises a front side wall and a lower side wall; and
the air outlet is formed on a transition position of the front side wall of the housing and the lower side wall of the housing.

6. The air conditioner according to claim 1,
wherein:
the air diffusing structure comprises a plurality of wind wheels, the plurality of wind wheels being engaged and driven by a gear structure, each wind wheel comprising an inner rib and an outer ring rib, a first blade group and a second blade group being disposed between the inner rib and the outer ring rib, blades in the first blade group being fixedly connected to the inner rib and the outer ring rib, the second blade group being rotatably connected to the inner rib, and the second blade group being provided with a first position and a second position;
when the second blade group is located on the first position, a plurality of blades in the second blade group and the plurality of blades in the first blade group are arranged at intervals; and
when the second blade group is located on the second position, the blades in the second blade group and the blades in the first blade group at least partially overlap in an axial directions of the wind wheels.

7. The air conditioner according to claim 6, wherein:
when the air output structure is in a first operative configuration, the air outlet is opened by the first air deflector, the air diffusing structure is abutted against the first air deflector and shields the air outlet, and the second blade group moves to the first position.

8. The air conditioner according to claim 7, wherein:
when the air output structure is in a second operative configuration, the air outlet is opened by the first air deflector, the air diffusing structure is abutted against the first air deflector and shields the air outlet, and the second blade group moves to the second position.

9. The air conditioner according to claim 7, wherein:
when the air output structure is in a third operative configuration, the air outlet comprises a first part of air outlet, a second part of air outlet, and a third part of air outlet, the first part of air outlet is closed by the first air deflector, the second part of air outlet is shielded by the air diffusing structure, the third part of air outlet is formed between the first air deflector and the air diffusing structure, and the second blade group moves to the second position.

10. The air conditioner according to claim 6, wherein:
the first air deflector and the air diffusing structure are spliced to define an included-angle-shaped cavity located on an outer side of the air outlet of the air conditioner and communicating with the air outlet of the air conditioner;
the included-angle-shaped cavity is formed with side openings along respective ends of a length direction of a splicing line of the first air deflector and the air diffusing structure; and
the side openings communicate with the included-angle-shaped cavity.

11. A control method for controlling the air conditioner according to claim 1, wherein the control method comprises:
acquiring an ambient temperature and an ambient humidity; and
switching the operative configurations of the air output structure of the air conditioner according to the ambient temperature and the ambient humidity.

12. The control method for the air conditioner according to claim 11, further comprising:
receiving a control instruction, and controlling the air output structure to be in a first operative configuration according to the control instruction.

13. The control method for the air conditioner according to claim 12, wherein the switching the operative configurations of the air output structure of the air conditioner according to the ambient temperature and the ambient humidity comprises:
acquiring a temperature threshold and a humidity threshold, and calculating a temperature difference of the ambient temperature and the temperature threshold and a humidity difference of the ambient humidity and the humidity threshold;
determining that the temperature difference is within a first preset temperature range, or the humidity difference is within a first preset humidity range, and switching the air output structure to be in a third operative configuration;
determining that the temperature difference is within a second preset temperature range, and the humidity difference is within a second preset humidity range or a third preset humidity range, and switching the air output structure to be in a second operative configuration;
determining that the temperature difference is within the second preset temperature range or a third preset temperature range, and the humidity difference is within the second preset humidity range, and switching the air output structure to be in the second operative configuration; and
determining that the temperature difference is within the third preset temperature range, and the humidity difference is within the third preset humidity range, and switching the air output structure to be in the first operative configuration.

14. The control method for the air conditioner according to claim 13, wherein:
the first preset temperature range is greater than a first temperature difference;
the second preset temperature range is greater than a second temperature difference and is smaller than or equal to the first temperature difference;
the third preset temperature range is smaller than or equal to the second temperature difference;
the first temperature difference ranges from 2° C. to 3.5° C.;
the second temperature difference ranges from 0° C. to 2.5° C.; and
the temperature threshold ranges from 25° C. to 27° C.

15. The control method for the air conditioner according to claim 13, wherein:
the first preset humidity range is greater than a first humidity difference;
the second preset humidity range is greater than a second humidity difference and is smaller than or equal to the first humidity difference;
the third preset humidity range is smaller than or equal to the second humidity difference;
the first humidity difference ranges from 10% to 30%;
the second humidity difference ranges from 0% to 10%; and
the humidity threshold ranges from 40% to 60%.

16. A non-transitory computer-readable storage medium storing a computer program, wherein when the computer program is executed by a processor, the control method for the air conditioner according to claim 11 is implemented.

17. An air conditioner comprising:
an air conditioner body provided with an air outlet;
an air output structure configured to adjust an air output angle of the air outlet, the air output structure having a plurality of operative configurations, wherein the plurality of operative configurations include a first operative configuration, a second operative configuration and third operative configuration;
a detection device configured to acquire an ambient temperature and an ambient humidity;
a communication interface configured to receive a control instruction; and
a controller electrically connected to the air output structure, the detection device and the communication interface, and configured to:
control the air output structure to the first operative configuration according to the control instruction received by the communication interface;
acquire a temperature threshold, and calculate a temperature difference of the ambient temperature and the temperature threshold;
acquire a humidity threshold, and calculate a humidity difference of the ambient humidity and the humidity threshold;
determine that the temperature difference is within a first preset temperature range, or the humidity difference is within a first preset humidity range, and switch the air output structure to be in the third operative configuration;

determine that the temperature difference is within a second preset temperature range, or the humidity difference is within a second preset humidity range or a third preset humidity range, and switch the air output structure to be in the second operative configuration;

determine that the temperature difference is within the second preset temperature range or a third preset temperature range, and the humidity difference is within the second preset humidity range, and switch the air output structure to be in the second operative configuration; and determine that the temperature difference is within the third preset temperature range, and the humidity difference is within the third preset humidity range, and switch the air output structure to be in the first operative configuration.

* * * * *